US012010437B2

(12) United States Patent
Aizawa et al.

(10) Patent No.: US 12,010,437 B2
(45) Date of Patent: Jun. 11, 2024

(54) ARRANGEMENT DETERMINATION APPARATUS, SYSTEM, ARRANGEMENT DETERMINATION METHOD, AND RECORDING MEDIUM

(71) Applicant: CANON KABUSHIKI KAISHA, Tokyo (JP)

(72) Inventors: Michio Aizawa, Kanagawa (JP); Yasushi Shikata, Port Washington, NY (US); Shinichiro Uno, Tokyo (JP); Atsushi Date, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/518,444

(22) Filed: Nov. 3, 2021

(65) Prior Publication Data

US 2022/0060638 A1    Feb. 24, 2022

Related U.S. Application Data

(63) Continuation of application No. PCT/JP2020/018779, filed on May 11, 2020.

(30) Foreign Application Priority Data

May 16, 2019  (JP) .................................. 2019-092773
Sep. 20, 2019  (JP) .................................. 2019-172187

(51) Int. Cl.
*H04N 23/90*  (2023.01)
*H04N 5/265*  (2006.01)
*H04N 23/61*  (2023.01)

(52) U.S. Cl.
CPC ............. *H04N 23/90* (2023.01); *H04N 5/265* (2013.01); *H04N 23/61* (2023.01)

(58) Field of Classification Search
None
See application file for complete search history.

(56) References Cited

U.S. PATENT DOCUMENTS

2008/0259162 A1    10/2008  Aoki
2011/0157017 A1*   6/2011  Webb .................... G06F 3/0317
                                                      345/158
(Continued)

FOREIGN PATENT DOCUMENTS

CN    109196854 A    1/2019
CN    109389545 A    2/2019
(Continued)

OTHER PUBLICATIONS

Marleene Morbee, et al., "Optimal Camera Selection in Vision Networks for Shape Approximation," Multimedia Signal Processing, IEEE, 10th Workshop, New Jersey, US, Oct. 8, 2008, pp. 46-51, XP031356599, ISBN: 978-1-4244-2294-4.

(Continued)

*Primary Examiner* — Eileen M Adams
(74) *Attorney, Agent, or Firm* — Canon U.S.A., Inc. IP Division

(57) ABSTRACT

An arrangement determination apparatus for determining an arrangement of a plurality of cameras that is used for generation of a virtual viewpoint image acquires information indicating an imaging target region, and determines an arrangement of the plurality of cameras based on the information in such a manner that images of the entire region of the imaging target region are captured by two or more cameras of the plurality of cameras and images of the entire region of the imaging target region are captured by different two or more cameras of the plurality of cameras that are different from the two or more cameras.

23 Claims, 21 Drawing Sheets

(56) References Cited

U.S. PATENT DOCUMENTS

| | | | |
|---|---|---|---|
| 2011/0234801 A1 | 9/2011 | Yamada | |
| 2018/0182114 A1* | 6/2018 | Hanamoto | G06T 7/55 |
| 2018/0332218 A1 | 11/2018 | Yoshimura | |
| 2018/0367709 A1* | 12/2018 | Takama | G06T 5/50 |

FOREIGN PATENT DOCUMENTS

| | | |
|---|---|---|
| CN | 109561296 A | 4/2019 |
| JP | 2005012619 A | 1/2005 |
| JP | 2010079505 A | 4/2010 |
| JP | 2011237713 A | 11/2011 |
| JP | 2014215855 A | 11/2014 |
| JP | 2017097799 A | 6/2017 |
| JP | 2018107793 A | 7/2018 |
| JP | 2019036791 A | 3/2019 |
| KR | 20050020521 A | 3/2005 |
| KR | 102300570 B1 | 9/2021 |
| WO | 2007013231 A1 | 2/2007 |
| WO | 2009125304 A2 | 10/2009 |
| WO | 2018232837 A1 | 12/2018 |

OTHER PUBLICATIONS

Vasu Parameswaran, et al., "Design and Validation of a System for People Queue Statistics Estimation," In: "Video Analytics for Business Intelligence," Berlin, Jan. 1, 2012, vol. 409, pp. 355-373, XP055094775, ISSN: 1860-949x, ISBN: 978-3-64-228598-1.

Kaichi Tomoya, et al., "Estimation of Center of Mass for Sports Scene Using Weighted Visual Hull," IEEE/CVF Conference on Computer Vision and Pattern Recognition Workshops (CVPRW), IEEE, Jun. 18, 2018, pp. 1890-1896, XP033475538, DOI: 10.1109/CVPRW.2018.00234.

Hsu Che-Hao, et al., "CrossbowCam: a handheld adjustable multi-camera system," Multimedia Tools and Applications, Kluwer Academic Publishers, Boston, US, Jun. 5, 2017, vol. 76, No. 23, pp. 24961-24981, XP036380491, ISSN: 1380-7501, DOI: 10.1007/S11042-017-4852-1.

* cited by examiner

FIG.17A

| INTENDED PURPOSE OF VIRTUAL VIEWPOINT IMAGE | LOWER LIMIT RESOLUTION (NUMBER OF PIXELS) |
|---|---|
| USE IN LIVE BROADCAST | 200 PIXELS |
| USE IN ARCHIVE DISTRIBUTION | 300 PIXELS |
| USE IN BEHAVIOR ANALYSIS OR TACTIC ANALYSIS | 100 PIXELS |
| ... | ... |

FIG.17B

| SIZE OF FIELD | MOVING RANGE OF SUBJECT | IMAGING TARGET REGION |
|---|---|---|
| 144 m × 70 m (RUGBY) | 5 m FROM TOUCHLINE, 5 m FROM DEAD-BALL LINE, 1 m FROM DEAD-BALL LINE | 146 m × 80 m |
| 105 m × 68 m (SOCCER) | 5 m FROM TOUCHLINE, 5 m FROM GOAL LINE | 115 m × 78 m |
| ... | ... | ... |

FIG.17C

| DENSITY OF SUBJECT | NUMBER OF CAMERA GROUPS |
|---|---|
| 10 | 12 |
| 5 | 8 |
| 2 | 4 |
| ... | ... |

FIG.19A

| TYPE OF SUBJECT | MOVING RANGE (m) | | |
|---|---|---|---|
| | VERTICAL | HORIZONTAL | HEIGHT |
| MOTIONLESS PERSON | 70 | 120 | 2 |
| MOVING PERSON | 80 | 130 | 5 |
| BALL | 90 | 140 | 20 |

FIG.19B

| IMAGING TARGET REGION | THREE-DIMENSIONAL SHAPE QUALITY DEMAND LEVEL | LOWER LIMIT RESOLUTION DEMAND LEVEL |
|---|---|---|
| FIRST IMAGING TARGET REGION | HIGH | HIGH |
| SECOND IMAGING TARGET REGION | MEDIUM | MEDIUM |
| THIRD IMAGING TARGET REGION | LOW | LOW |

FIG.19C

| IMAGING TARGET REGION | NUMBER OF GROUPS |
|---|---|
| FIRST IMAGING TARGET REGION | 30 |
| SECOND IMAGING TARGET REGION | 24 |
| THIRD IMAGING TARGET REGION | 10 |

ARRANGEMENT DETERMINATION APPARATUS, SYSTEM, ARRANGEMENT DETERMINATION METHOD, AND RECORDING MEDIUM

CROSS-REFERENCE TO RELATED APPLICATIONS

This application is a Continuation of International Patent Application No. PCT/JP2020/018779, filed May 11, 2020, which claims the benefit of Japanese Patent Applications No. 2019-092773, filed May 16, 2019, and No. 2019-172187, filed Sep. 20, 2019, all of which are hereby incorporated by reference herein in their entirety.

BACKGROUND OF THE INVENTION

Field of the Invention

The present invention relates to a technique of determining an arrangement of a plurality of imaging apparatuses.

Background Art

In recent years, a technique of arranging a plurality of imaging apparatuses at different positions, synchronously capturing images, and generating a virtual viewpoint image viewed from a designated virtual viewpoint using a plurality of images obtained by the image capturing has attracted attention.

Patent Literature 1 (PTL 1) discusses a technique of generating a virtual viewpoint image, and discusses arranging a plurality of imaging apparatuses along a circumference of a circle targeted as an imaging target region to direct the plurality of imaging apparatuses toward the center of the circle.

In PTL 1, the number of imaging apparatuses capturing images of an object near the center of the circle targeted as the imaging target region is different from the number of imaging apparatuses capturing images of an object at a position distant from the center of the circle. In a case where an imaging target region is large, the difference becomes much larger. Consequently, a difference in reproducibility of objects in virtual viewpoint images sometimes becomes large between virtual viewpoints.

CITATION LIST

Patent Literature

PTL 1: Japanese Patent Laid-Open No. 2010-79505

SUMMARY OF THE INVENTION

In view of the above-described issue, the present invention is directed to reducing a difference in reproducibility of objects between virtual viewpoints even in a wide-range imaging target region.

An aspect of the present invention is as follows. An arrangement determination apparatus for determining an arrangement of a plurality of imaging apparatuses that is used for generation of a virtual viewpoint image, the arrangement determination apparatus includes a region acquisition unit configured to acquire information indicating an imaging target region serving as a target of image capturing to be performed by the plurality of imaging apparatuses, and an arrangement determination unit configured to determine an arrangement of the plurality of imaging apparatuses based on the information acquired by the region acquisition unit, in such a manner that images of an entire region of the imaging target region are captured by two or more imaging apparatuses of the plurality of imaging apparatuses and images of the entire region of the imaging target region are captured by other two or more imaging apparatuses of the plurality of imaging apparatuses that are different from the two or more imaging apparatuses.

Further features of the present invention will become apparent from the following description of exemplary embodiments with reference to the attached drawings.

BRIEF DESCRIPTION OF THE DRAWINGS

FIG. 17A is a diagram illustrating an example of a table to be referred to by the arrangement determination apparatus according to the first exemplary embodiment. FIG. 17B is a diagram illustrating an example of a table to be referred to by the arrangement determination apparatus according to the first exemplary embodiment. FIG. 17C is a diagram illustrating an example of a table to be referred to by the arrangement determination apparatus according to the first exemplary embodiment.

FIG. 19A is a diagram illustrating an example of a table to be referred to by the arrangement determination apparatus according to the third exemplary embodiment. FIG. 19B is a diagram illustrating an example of a table to be referred to by the arrangement determination apparatus according to the third exemplary embodiment. FIG. 19C is a diagram illustrating an example of a table to be referred to by the arrangement determination apparatus according to the third exemplary embodiment.

DESCRIPTION OF THE EMBODIMENTS

Figure 1:
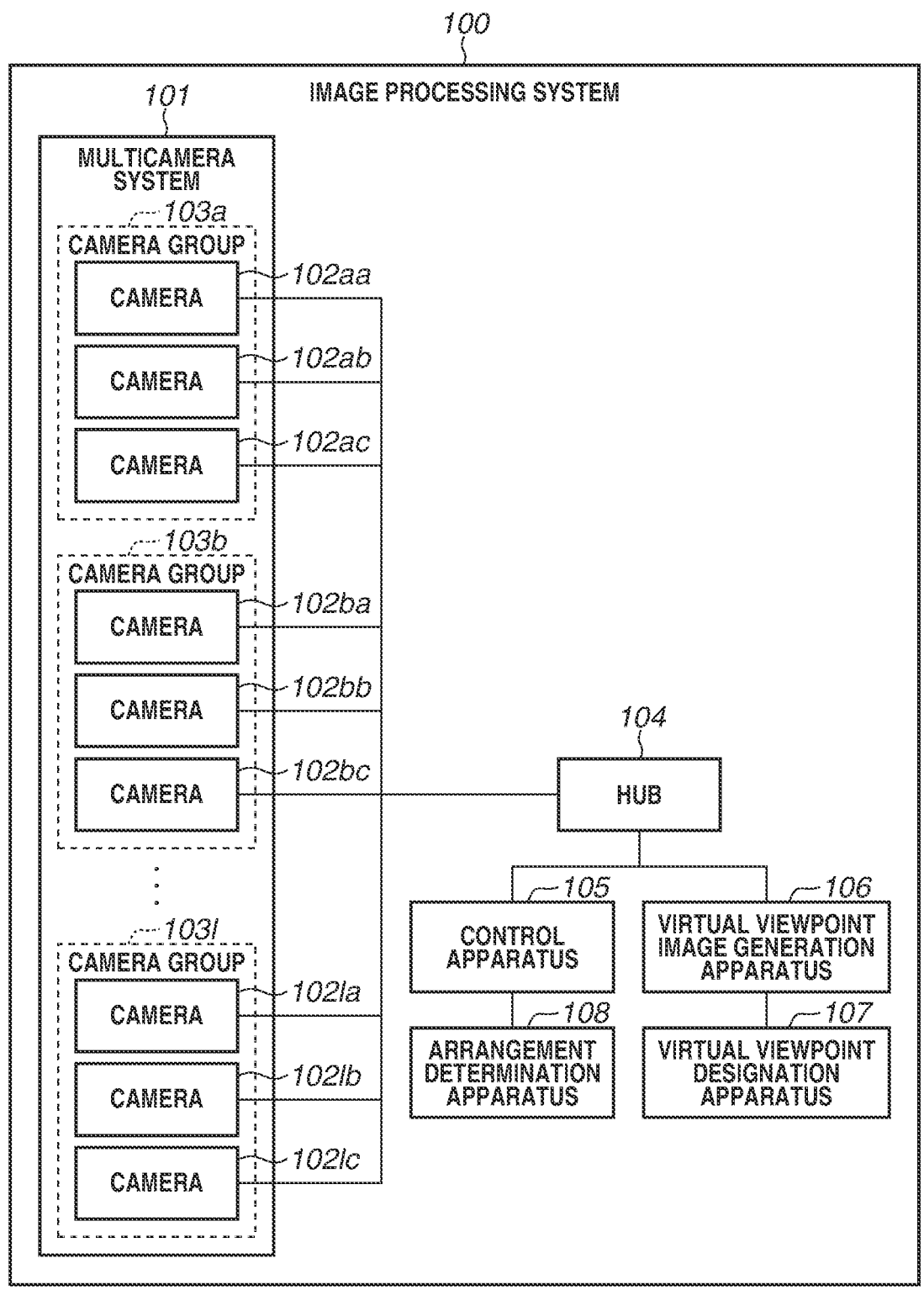
FIG. 1 is a diagram illustrating a configuration example of an image processing system.

Hereinafter, exemplary embodiments of the present invention will be described with reference to the drawings. The following exemplary embodiments are not intended to limit the present invention. In addition, not all the combinations of features described in the present exemplary embodiment are always essential to the solution of the present invention. The same configuration will be described with being assigned the same reference numeral.

First Exemplary Embodiment

FIG. 1 is a diagram illustrating an example of a configuration of an image processing system 100. The image processing system 100 includes a multicamera system 101, a hub 104, a control apparatus 105, and a virtual viewpoint image generation apparatus 106. In addition, the image processing system 100 may include a virtual viewpoint designation apparatus 107 and an arrangement determination apparatus 108.

The image processing system 100 is a system that generates a virtual viewpoint image of a view from a designated viewpoint, based on a plurality of images obtained by image capturing performed by a plurality of imaging apparatuses and a designated virtual viewpoint. The virtual viewpoint image in the present exemplary embodiment will also be referred to as a free viewpoint video. The virtual viewpoint image is not limited to an image corresponding to a viewpoint freely (arbitrarily) designated by a user. For example, an image corresponding to a viewpoint selected by the user from among a plurality of candidates is also included in the virtual viewpoint image. In addition, in the present exemplary embodiment, the description will be mainly given of a case where designation of a virtual viewpoint is performed by a user operation, but designation of a virtual viewpoint may be automatically performed based on a result of image analysis. In addition, in the present exemplary embodiment, the description will be mainly given of a case where a virtual viewpoint image is a moving image, but a virtual viewpoint image may be a still image.

The multicamera system 101 includes a plurality of cameras (imaging apparatuses) 102aa to 102lc that capture images of an imaging target space from a plurality of directions. The plurality of cameras 102aa to 102lc belong to any camera group of a plurality of camera groups 103a to 103l. In the following description, the cameras 102aa to 102lc will be described as the camera(s) 102 and the camera groups 103a to 103l will be described as the camera group(s) 103 in a case where there is no need to make a distinction.

Each of the camera groups 103 includes one or more cameras 102. Specifically, three cameras 102aa, 102ab, and 102ac belong to a camera group 103a. The number of cameras belonging to the camera group 103 is not limited to three, and may be two or less or four or more. In addition, the numbers of cameras 102 belonging to the individual camera groups 103 may be the same, or may be different.

A plurality of images captured by a plurality of cameras 102 is transmitted to the virtual viewpoint image generation apparatus 106 through the hub 104. The control apparatus 105 controls image capturing of the multicamera system 101 and manages an arrangement status of a plurality of cameras 102 included in the multicamera system 101.

The virtual viewpoint image generation apparatus 106 generates a virtual viewpoint image viewed from a viewpoint designated by the virtual viewpoint designation apparatus 107, based on a plurality of images captured by the multicamera system 101. Viewpoint information designated by the virtual viewpoint designation apparatus 107 is information indicating a position and an orientation of a virtual viewpoint. Specifically, the viewpoint information is a parameter set including a parameter indicating a three-dimensional position of a virtual viewpoint, and a parameter indicating an orientation of a virtual viewpoint in pan, tilt, and roll directions. The content of the viewpoint information is not limited to the above-described content. For example, a parameter set serving as viewpoint information may include a parameter indicating a size of a viewing field (field angle) of a virtual viewpoint. In addition, the viewpoint information may include a plurality of parameter sets. For example, the viewpoint information may be information including a plurality of parameter sets each corresponding to a different one of a plurality of frames included in a moving image of a virtual viewpoint image, and indicating positions and orientations of virtual viewpoints at a plurality of consecutive time points. The virtual viewpoint designation apparatus 107 is connected with the virtual viewpoint image generation apparatus 106 or the image processing system 100 in a wired or wireless manner.

The virtual viewpoint image generation apparatus 106 generates a virtual viewpoint image by the following method, for example. First of all, a plurality of images is acquired by performing image capturing from different directions using a plurality of imaging apparatuses. Next, a foreground image obtained by extracting a foreground region corresponding to a predetermined object, such as a person or a ball, and a background image obtained by extracting a background region other than the foreground region are acquired from the plurality of images. In addition, a foreground model representing a three-dimensional shape of the predetermined object and texture data for coloring the foreground model are generated based on the foreground image. Texture data for coloring a background model representing a three-dimensional shape of a background of a sports stadium, for example, is generated based on the background image. Then, a virtual viewpoint image is generated by mapping the texture data with respect to the foreground model and the background model and performing rendering in accordance with a virtual viewpoint indicated by the viewpoint information. Examples of the background include a field and a goalpost. The generation method of a virtual viewpoint image is not limited to this. Various methods such as a method of generating a virtual viewpoint image by projection transform of a captured image without using a three-dimensional model can be used.

The arrangement determination apparatus 108 determines an arrangement of a plurality of cameras 102 included in the multicamera system 101 as described below. The arrangement determination apparatus 108 may be included in the image processing system 100 and may not be included in the image processing system 100. The arrangement determination apparatus 108 is connected with the control apparatus 105 or the image processing system 100 in a wired or wireless manner.

The above-described foreground image and background image may be extracted from images captured by the virtual viewpoint image generation apparatus 106, or may be extracted by another apparatus, such as the cameras 102, for example. In a case where the foreground image and the background image are extracted by the cameras 102, both of the foreground image and the background image may be extracted by each of a plurality of cameras 102, or one or more of cameras among a plurality of cameras 102 may extract the foreground image, and other cameras different from the one or more of cameras among the plurality of cameras 102 may extract the background image. In addition, a plurality of cameras 102 may include a camera 102 that does not extract the foreground image nor the background image.

Figure 2:
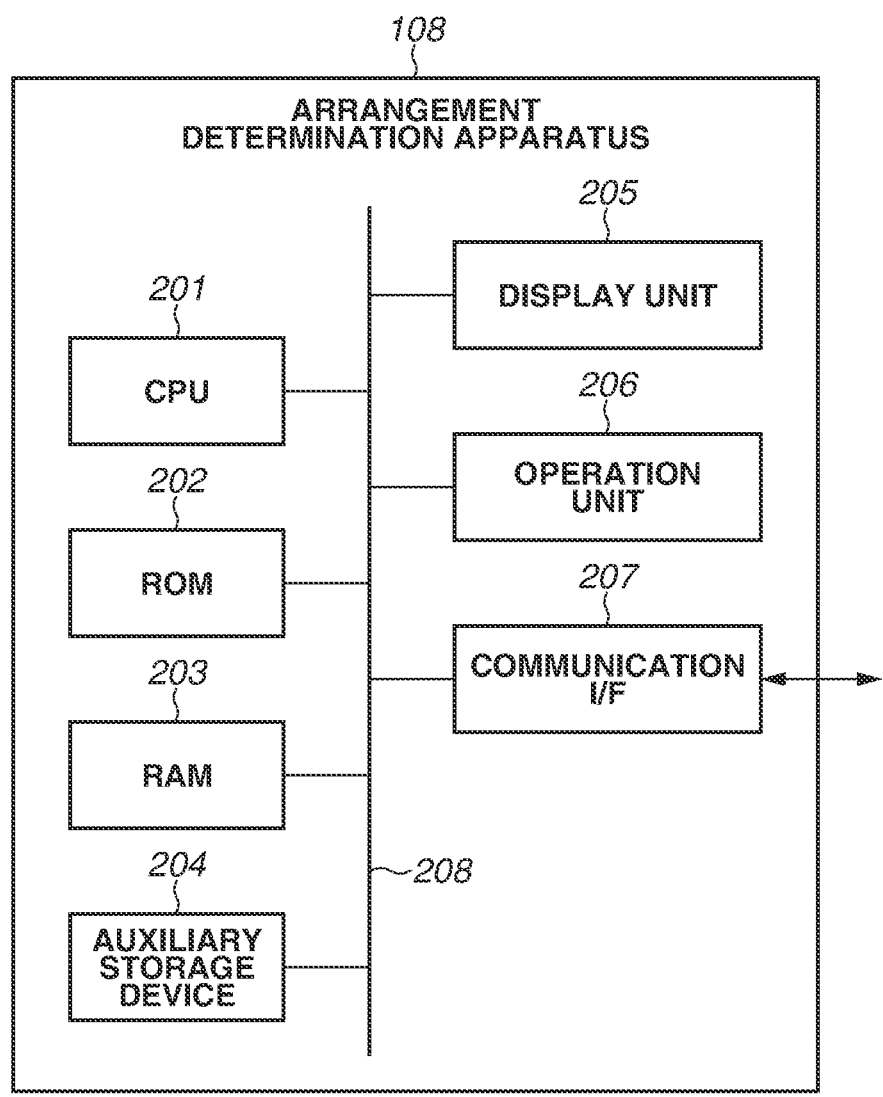
FIG. 2 is a diagram illustrating a hardware configuration example of an arrangement determination apparatus.

FIG. 2 is a diagram illustrating an example of a hardware configuration of the arrangement determination apparatus 108. A central processing unit (CPU) 201 implements each function of an information processing apparatus by controlling the entire information processing apparatus using computer programs and data stored in a read-only memory (ROM) 202 and a random access memory (RAM) 203. The information processing apparatus may include one or a plurality of dedicated hardware components that are different from the CPU 201, and the dedicated hardware components may execute at least part of processing to be executed by the CPU 201. Examples of the dedicated hardware components include an application specific integrated circuits (ASIC), a field programmable gate array (FPGA), and a digital signal processor (DSP). The ROM 202 stores programs not requiring changes.

The RAM 203 temporarily stores programs and data supplied from an auxiliary storage device 204 and data supplied from the outside via a communication interface (I/F) 207. The auxiliary storage device 204 includes a hard disc drive, for example, and stores various types of data, such as image data and voice data. A display unit 205 includes a liquid crystal display and a light-emitting diode (LED), for example, and displays a graphical user interface (GUI) for the user operating the information processing apparatus.

An operation unit 206 includes a keyboard, a mouse, a joystick, and a touch panel, for example, and inputs various instructions to the CPU 201 by receiving operations performed by the user. The communication I/F 207 is used for communication with an external apparatus of the information processing apparatus. For example, in a case where the information processing apparatus is connected with an external apparatus in a wired manner, a communication cable is connected to the communication I/F 207. In a case where the information processing apparatus has a function of wirelessly communicating with an external apparatus, the communication I/F 207 includes an antenna. A bus 208 connects the components of the information processing apparatus and conveys information.

In the present exemplary embodiment, the display unit 205 and the operation unit 206 are provided in the arrangement determination apparatus 108, but at least one of the display unit 205 and the operation unit 206 may be provided as another apparatus on the outside of the arrangement determination apparatus 108. In this case, the CPU 201 may operate as a display control unit for controlling the display unit 205 and an operation control unit for controlling the operation unit 206.

Figure 3:
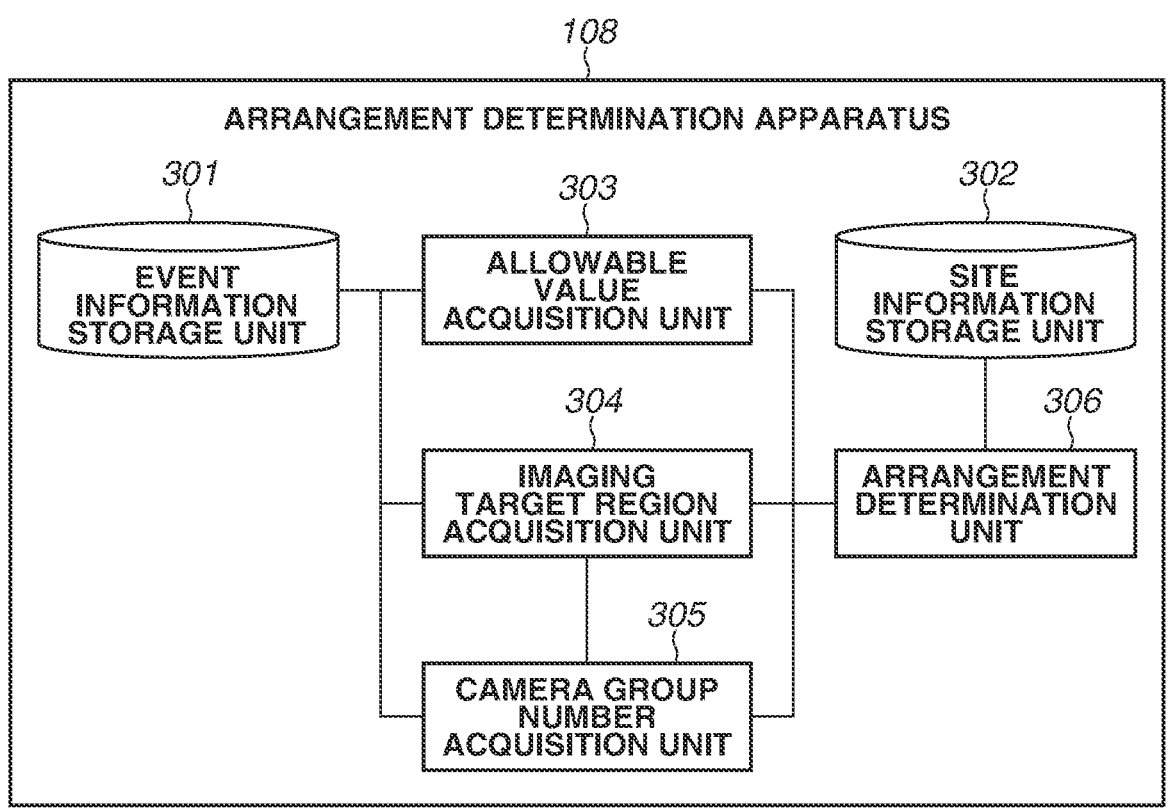
FIG. 3 is a diagram illustrating a configuration example of an arrangement determination apparatus according to a first exemplary embodiment.

FIG. 3 is a diagram illustrating an example of a functional configuration of the arrangement determination apparatus 108. The arrangement determination apparatus 108 includes an allowable value acquisition unit 303, an imaging target region acquisition unit 304, a camera group number acquisition unit 305, and an arrangement determination unit 306. The arrangement determination apparatus 108 may further include an event information storage unit 301 and a site information storage unit 302. In the present exemplary embodiment, the description will be given of an example in which the arrangement determination apparatus 108 includes the event information storage unit 301 and the site information storage unit 302. Alternatively, the event information storage unit 301 and the site information storage unit 302 may be included in an apparatus different from the arrangement determination apparatus 108, and the arrangement determination apparatus 108 may acquire necessary information from the apparatus.

The event information storage unit 301 stores information regarding an imaging target event. For example, the event information includes the following information: information that can identify a type of an event and another event, information regarding a size of a field, information regarding a moving range of an object, information regarding density of objects, information regarding an intended purpose of a virtual viewpoint image, and information regarding a scale of an event. Examples of the type of an event include a sporting event, such as rugby, soccer, bouldering, baseball, athletic sports, water sports, and ice sports, concert, and theatrical performance, but are not specifically limited. The field refers to a plane on which a person or a ball serving as an object in an event, or a moving object such as a tool being used in an event can move. A moving range of an object is set for each event. The density of objects refers to a numerical value of density of persons of a case where persons serving as objects are dense in an event. For example, when densities of rugby, soccer, baseball are compared, rugby has the largest density, and baseball has the smallest density. Density of objects in rugby is large because plays, such as scrum and maul, occur. Examples of intended purpose of a virtual viewpoint image are for use in live broadcast, use in archive distribution, and for use in behavior analysis or tactic analysis.

The site information storage unit 302 stores information regarding a site in which a plurality of cameras 102 is arranged. For example, the site information includes the following information: information regarding a name of a site, information regarding a size of the site, information regarding a structure capable of setting cameras 102 thereon and a position of the structure in the site, and information regarding the number of cameras 102 capable of being arranged. The site is a stadium serving as a competition site of rugby or soccer, or a site of theatrical performance or concert. The site may be a training field of a sport team. The information indicating a structure capable of setting the cameras 102 thereon and a position of the structure may be represented by a two-dimensional image or may be represented as three-dimensional data.

When the camera 102 captures an image of a predetermined reference object, the allowable value acquisition unit 303 sets and acquires a lower limit value of a resolution that is a size of the object in the image. Specifically, the allowable value acquisition unit 303 sets a lower limit resolution in accordance with an intended purpose of a virtual viewpoint image. For example, in a case where an intended purpose of a virtual viewpoint image is an overhead image for live broadcast, a small lower limit resolution is set. In a case where an intended purpose of a virtual viewpoint image is a replay image, a large lower limit resolution is set. The lower limit resolution will be described below.

The allowable value acquisition unit 303 may prestore a table having correspondence between an intended purpose of a virtual viewpoint image serving as one type of event information and a lower limit resolution, and set a lower limit resolution by referring to the table. More specifically, in a case where the allowable value acquisition unit 303 receives an input of information for identifying an event from an operator via the operation unit 206, the allowable value acquisition unit 303 may acquire a lower limit resolution by referring to event information stored in the event information storage unit 301 and a table thereof. FIG. 17A illustrates an example of a table to be referred to. The table to be referred to is not limited to this as long as information regarding an intended purpose of a virtual viewpoint image and information regarding a lower limit resolution are associated. Event information other than the above-described event information and information regarding a lower limit resolution may be associated. In the table to be referred to, information for identifying an event, such as a name of an event, and a lower limit resolution may be associated. The table to be referred to may be stored in the event information storage unit 301 or may be stored in an external apparatus.

The allowable value acquisition unit 303 may acquire information regarding a numerical value of a lower limit resolution directly from an operator via the operation unit 206.

The imaging target region acquisition unit 304 determines an imaging target region being a region serving as an imaging target of the multicamera system 101, based on event information. Specifically, the imaging target region acquisition unit 304 has the following configuration. The imaging target region acquisition unit 304 initially stores a table associating at least partial information of event information and information indicating an imaging target region. At least partial information of event information includes information regarding a size of a field and information regarding a moving range of an object. Then, in a case where the imaging target region acquisition unit 304 receives an input of information for identifying an event from an operator via the operation unit 206, the imaging target region acquisition unit 304 determines an imaging target region by referring to event information stored in the event information storage unit 301 and a table thereof. FIG. 17B illustrates an example of a table to be referred to. The table to be referred to is not limited to this as long as information regarding a size of a field, information regarding a moving range of an object, and information regarding an imaging target region are associated. Event information other than the above-described event information and information regarding an imaging target region may be associated. In the table to be referred to, information for identifying an event, such as a name of an event, and an imaging target region may be associated. Table to be referred to may be stored in the event information storage unit 301, or may be stored in an external apparatus.

The imaging target region acquisition unit 304 may acquire information regarding an imaging target region directly from an operator via the operation unit 206.

Figure 5A:
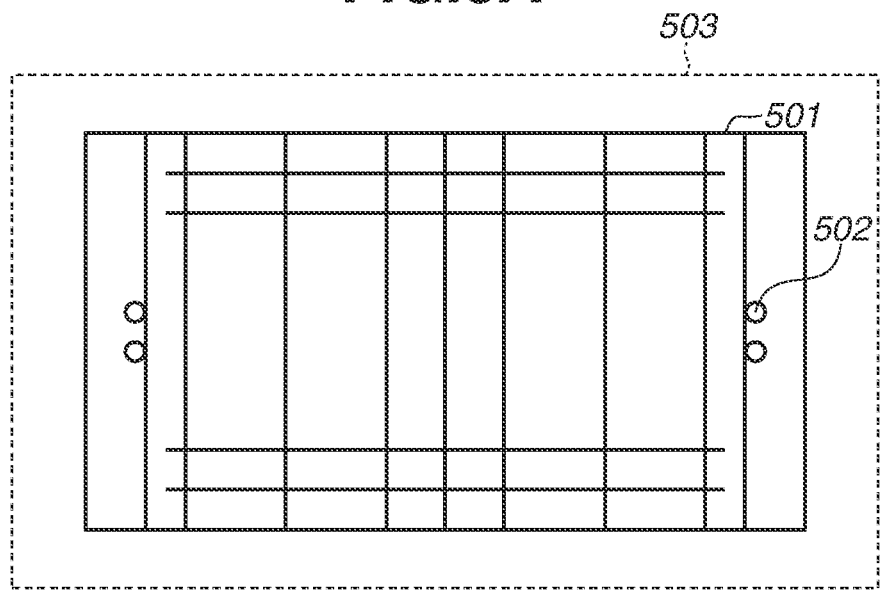
FIG. 5A is a diagram illustrating an example of an imaging target region according to the first exemplary embodiment.

An imaging target region will be described. FIG. 5A is a diagram illustrating an example of an imaging target region. FIG. 5A illustrates an example case where an event is rugby. An imaging target region 503 is a two-dimensional plane and constitutes a part of a space 504 illustrated in FIG. 5B. The imaging target region 503 is determined by the imaging target region acquisition unit 304 based on a size of a field 501 and a moving range of an object, such as a person (player) or a ball. The moving range includes not only a moving range on the field 501 but also a moving range around the field 501, because a player stands on the outside of a touchline when the player takes the throw in due to line-out, for example. The size of a moving range may be set in accordance with the event. For example, in the case of rugby, a moving distance may be defined by a distance or an angle from a touchline, a dead-ball line, a touch-in-goal line, and a goalpost 502, or may be defined by a range set to include the field 501. In addition, in the case of soccer, a moving distance may be similarly defined by a distance or an angle from a touchline, a goal line, and a position of a corner flag. In addition, in the case of baseball, a moving distance may be set as a moving range including a foul zone.

In the above described manner, the imaging target region 503 is set to include a play area (field 501) and further include a predetermined range on the outside of the play area. By setting the imaging target region 503 in this manner, it is possible to generate a high-quality virtual viewpoint image over the entire region of the field 501.

Figure 5B:
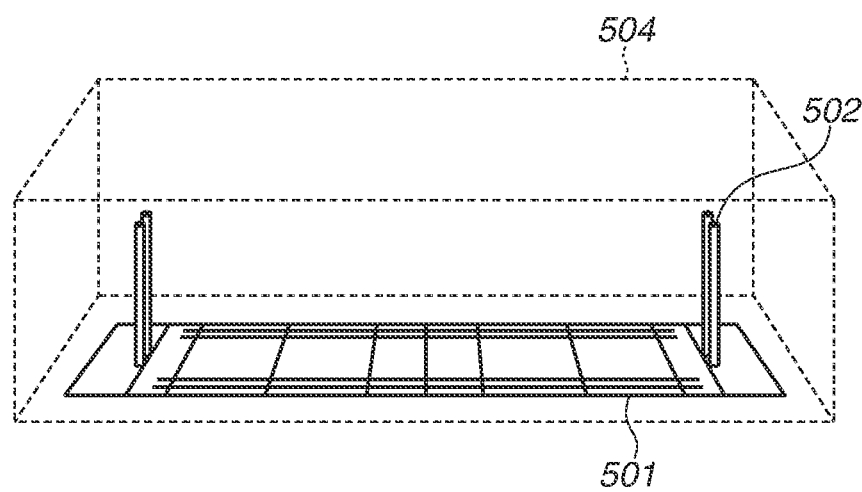
FIG. 5B is a diagram illustrating an example of the imaging target region according to the first exemplary embodiment.

FIG. 5B is a diagram illustrating an example in which the space 504 that considers a height direction is set as an imaging target region. In other words, in the example illustrated in FIG. 5B, an imaging target region is a three-dimensional space. In FIG. 5B, an imaging target region is set to include a range including a space above the goalpost 502 in consideration of a range in which a ball mainly moves. Aside from this, the imaging target region may be a space set considering a predetermined height from the field 501. For example, the predetermined height is a body height of a person (player), a height by which a person jumps, or a reach point of a player to be lifted at the time of line-out.

The camera group number acquisition unit 305 acquires the number of camera groups 103 that are included in the multicamera system 101, to capture images of the imaging target region 503 from a plurality of directions. Specifically, the camera group number acquisition unit 305 sets the number of camera groups 103 based on a density of objects. In a case where a density of objects is large, the camera group number acquisition unit 305 sets a larger number of camera groups 103 as compared with a case where a density of objects is small. The camera group number acquisition unit 305 may prestore a table having correspondence between a density of objects serving as one type of event information and the number of camera groups 103, and set the number of camera groups 103 by referring to the table. More specifically, in a case where the camera group number acquisition unit 305 receives an input of information for identifying an event from an operator via the operation unit 206, the camera group number acquisition unit 305 may acquire the number of camera groups 103 by referring to event information stored in the event information storage unit 301 and a table thereof. FIG. 17C illustrates an example of a table to be referred to. The table to be referred to is not limited to this as long as information regarding a density of objects and information regarding the number of camera groups 103 are associated. Event information other than the above-described event information and information regarding the number of camera groups 103 may be associated. In the table to be referred to, information for identifying an event, such as a name of an event, and the number of camera groups 103 may be associated. The table to be referred to may be stored in the event information storage unit 301, or may be stored in an external apparatus.

The camera group number acquisition unit 305 may acquire information regarding the number of camera groups 103 directly from an operator via the operation unit 206.

The arrangement determination unit 306 determines the arrangement of the cameras 102 based on a lower limit resolution, the imaging target region 503, the number of camera groups, and site information. The lower limit resolution is acquired by the allowable value acquisition unit 303, the imaging target region 503 is acquired by the imaging target region acquisition unit 304, and the number of camera groups is acquired by the camera group number acquisition unit 305. In addition, the site information is stored in the site information storage unit 302. Based on information for identifying a site that has been input via the operation unit 206, the arrangement determination unit 306 acquires necessary site information from the site information storage unit 302. For example, site information to be acquired includes information regarding a structure capable of setting the cameras 102 thereon and a position of the structure and information regarding the number of cameras 102 capable of being arranged.

Specifically, the arrangement determination unit 306 initially determines arrangement positions of camera groups 103 based on the imaging target region 503, the number of camera groups, and site information. Next, the arrangement determination unit 306 determines an arrangement of a plurality of cameras 102 belonging a different one of the camera groups 103, for each of the camera groups 103. At this time, the arrangement determination unit 306 determines the arrangement of a plurality of cameras 102 belonging to each of the camera groups 103 in such a manner that images of the entire region of the imaging target region 503 are captured by the plurality of cameras 102 belonging to the camera groups 103. Furthermore, the arrangement determination unit 306 determines the arrangement of a plurality of cameras 102 in such a manner that resolutions of the plurality of cameras 102 belonging to the camera groups 103 exceed a lower limit resolution over the entire region of the imaging target region 503. The arrangement determination unit 306 determines the arrangement of the plurality of cameras 102 in such a manner that a condition regarding the above-described imaging target region and a condition regarding a resolution are satisfied in all the camera groups 103, but the determination is not limited to this. For example, the arrangement determination unit 306 may determine the arrangement of the plurality of cameras 102 in such a manner that only a plurality of cameras 102 belonging to a predetermined number of camera groups 103 satisfy the above-described conditions. The arrangement determination unit 306 may determine an arrangement of a plurality of cameras 102 belonging to a camera group 103 existing at a predetermined position or a camera group 103 being in a predetermined relationship, in such a manner that the camera group 103 satisfies the above-described conditions. In other words, a plurality of cameras 102 belonging to a part of camera groups 103 may be arranged in such a manner that images of not the entire region but a partial region of the imaging target region 503 are captured by the plurality of cameras 102. Resolutions of a plurality of cameras 102 belonging to a part of the camera groups 103 may not exceed a lower limit resolution in a partial region of the imaging target region 503.

Figure 4:
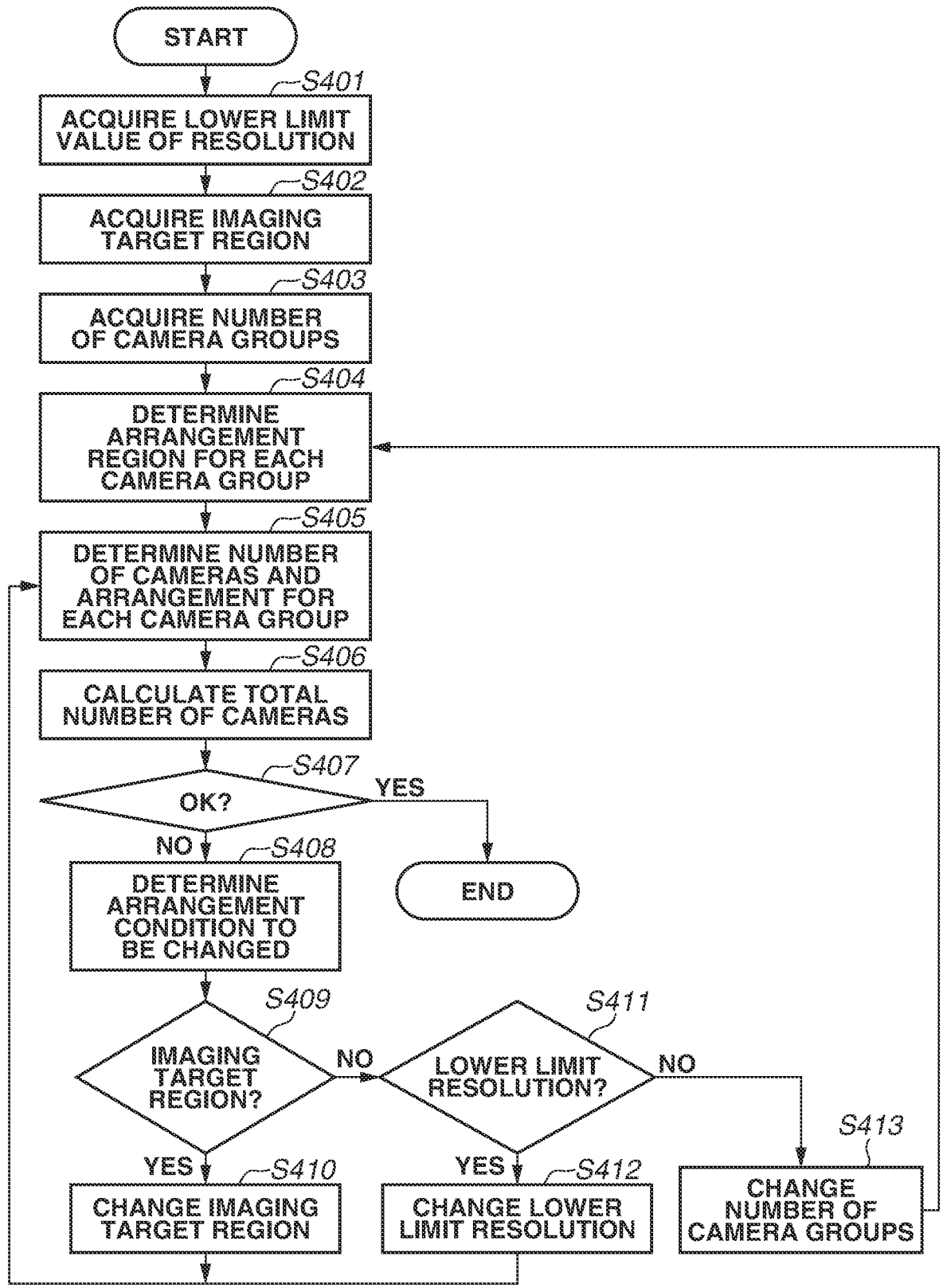
FIG. 4 is a flowchart illustrating a processing procedure example of the arrangement determination apparatus according to the first exemplary embodiment.

FIG. 4 is a flowchart illustrating an example of a processing procedure of the arrangement determination apparatus 108. Processing to be performed by the arrangement determination apparatus 108 will be described with reference to FIG. 4.

First of all, the arrangement determination apparatus 108 receives an instruction of arrangement determination from an operator via the operation unit 206. In step S401, the allowable value acquisition unit 303 acquires a lower limit resolution in accordance with the instruction.

Before a lower limit resolution will be described, a resolution will be described. Resolution refers to a size of a reference object in an image captured by the camera 102 and is represented by the number of pixels. The reference object may be a typical object or a virtual object, or may be a specific object or an arbitrary object in an imaging target event. For example, an upstanding player with a body height of two meters is defined as a reference object. In this case, the number of pixels corresponding to a part from the top of the head to the toe of the upstanding player with the body height of two meters is regarded as a resolution in an image captured by the camera 102.

Figure 6:
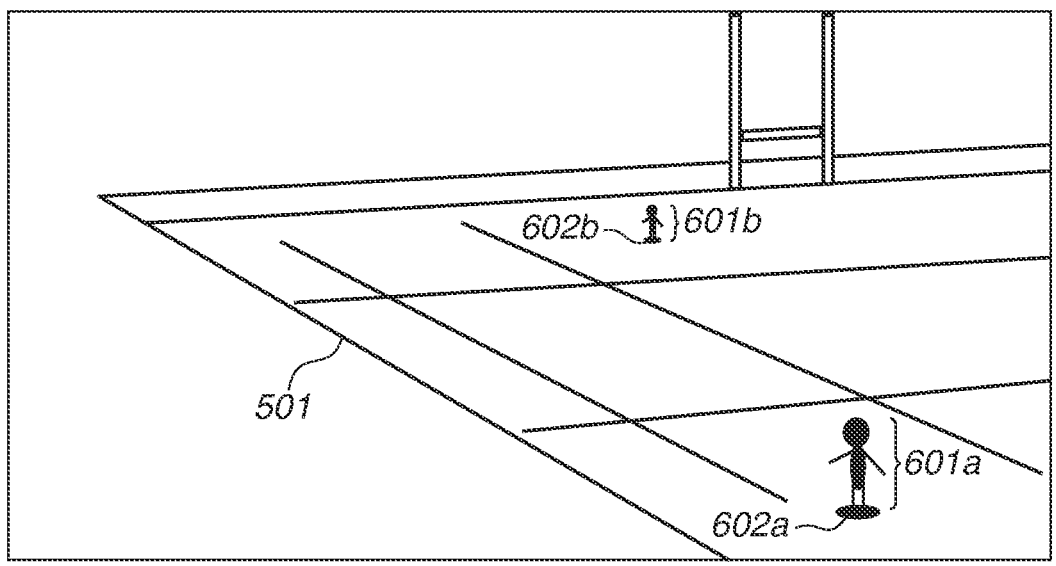
FIG. 6 is a diagram illustrating resolution.

FIG. 6 is a diagram illustrating a resolution. The number of pixels in a captured image having a body height of a reference object (in this example, an upstanding player with a body height of two meters) existing at a position 602a in the field 501 is represented as a resolution 601a. In addition, the number of pixels in the captured image having a body height of the reference object at a position 602b is represented as a resolution 601b. The resolution varies in accordance with a distance from the camera 102 or a focal length of the camera 102. For example, the resolution 601a at the position 602a closer to the camera 102 becomes larger than the resolution 601b at the distant position 602b.

A lower limit resolution is an allowable value of a resolution in an image captured by the camera 102. The lower limit resolution affects image quality of an object in a virtual viewpoint image. In other words, if the number of pixels of a reference object becomes larger than the lower limit resolution in a virtual viewpoint image, image degradation is caused by an effect similar to digital zooming. The lower limit resolution is therefore determined in accordance with a desired size and a desired composition of an object in a virtual viewpoint image. A case where a reference object appears in a quarter size of a virtual viewpoint image is taken as an example. A size of the virtual viewpoint image is set to 1920 pixels×1080 pixels. In this case, the lower limit resolution is determined to be 1080 pixels/4=270 pixels. The lower limit resolution may be determined in such a manner that digital zooming is allowed to a certain extent. For example, if 1.2× digital zooming is determined to be allowable, the lower limit resolution is determined to be 270/1.2=225 pixels.

The lower limit resolution indicates the minimum number of pixels in a captured image to represent a reference object at an arbitrary position in the field 501. The lower limit resolution is not limited to this. For example, the lower limit resolution may indicate the minimum number of pixels in a captured image to represent a reference object not at an arbitrary position in the field 501 but at a predetermined position or within a predetermined range.

As described above, the allowable value acquisition unit 303 determines and acquires the lower limit resolution based on information for identifying an event input by the operator via the operation unit 206 and a prestored table.

Next, in step S402, the imaging target region acquisition unit 304 determines and acquires the imaging target region 503. Specifically, as described above, the imaging target region 503 is determined based on information for identifying an event input by the operator via the operation unit 206 and a prestored table. The imaging target region 503 is as described above.

In step S403, the camera group number acquisition unit 305 determines and acquires the number of camera groups 103. The number of camera groups 103 is determined in accordance with the number of directions necessary for the virtual viewpoint image generation apparatus 106 accurately generating three-dimensional shape data of an object. The number of directions necessary for generating three-dimensional shape data of an object varies depending on density of objects. The camera group number acquisition unit 305 prestores a table having a density of objects and the necessary number of directions (i.e., the number of camera groups) in association with each other. For example, the camera group number acquisition unit 305 generates a virtual viewpoint image using computer graphics (CG) modeling an object, and prestores a table having the number of necessary directions and viewpoint positions thereof in association with density of objects in consideration of image quality of the generated virtual viewpoint image. For example, in a situation in which an object exists alone, such as a pitcher of baseball, because occlusion is unlikely to occur, it is sufficient that image capturing is performed from a small number of directions. In contrast, in a situation in which a large number of objects are dense, such as scrum of rugby, image capturing is to be performed from a large number of directions. The determined number of directions is determined as the number of camera groups 103. Hereinafter, the number of camera groups 103 is determined to be twelve as an example. While arrangement regions of the camera groups 103 may be determined in this step, arrangement regions of the camera groups 103 are determined in the next step S404 in the present exemplary embodiment.

Figure 7:
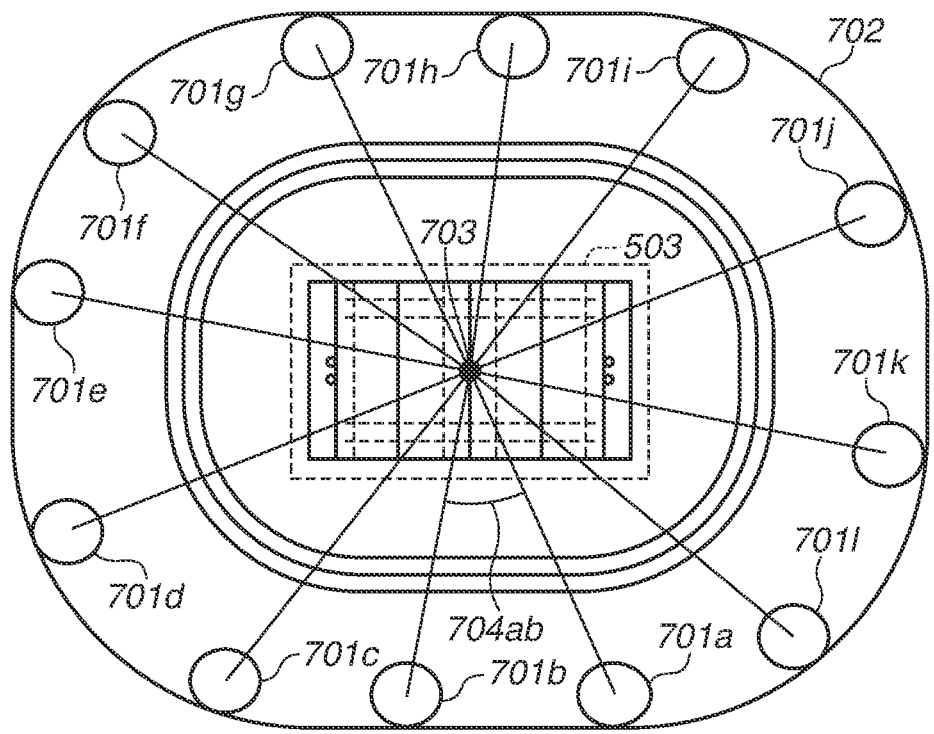
FIG. 7 is a diagram illustrating an example of an arrangement region.

In step S404, the arrangement determination unit 306 determines arrangement regions of the camera groups 103 based on the number of camera groups and site information. Arrangement determination processing will be described in detail with reference to FIGS. 7 to 12. FIG. 7 is a diagram illustrating an example of arrangement positions of the camera groups 103. First of all, regions in which the cameras 102 can be arranged are determined as candidates of arrangement regions 701a to 701l, based on site information, such as a design drawing of a stadium 702, for example. The candidates of the arrangement regions 701a to 701l include a pillar, a pathway, a handrail, and a ceiling of the stadium 702. The determined candidates of arrangement regions may be displayed on the display unit 205. Hereinafter, the arrangement regions 701a to 701l will be referred to as arrangement regions 701 unless otherwise an exceptional circumstance occurs.

Next, from among the candidates of the arrangement regions 701, the arrangement regions 701 of the camera groups 103 are determined in accordance with the following standard. If an interval between two adjacent camera groups 103 capturing images of an object becomes larger, the image quality of a virtual viewpoint image generated from a virtual viewpoint designated at a position between the camera groups 103 declines. Thus, if intervals between the camera groups 103 are nonuniform, image quality of virtual viewpoint images varies in accordance with a position of a designated virtual viewpoint. For this reason, the arrangement regions 701 of the camera groups 103 are desirably determined at intervals as equal as possible when viewed from an object in the imaging target region 503. For example, the arrangement regions 701 are determined in such a manner that angles between adjacent arrangement regions 701 become equal when viewed from an object at a center 703 of the imaging target region 503. In a case where the number of camera groups 103 is twelve, an ideal angle between adjacent arrangement regions 701 is 360 degrees/12=30 degrees. Thus, for example, the arrangement regions 701a and 701b are determined in such a manner that an angle 704ab therebetween becomes 30 degrees. In some possible cases, the arrangement regions 701 cannot be determined at equal intervals due to the structure of the stadium 702, such as a position of a pillar. Thus, for example, the arrangement regions 701 may be determined by preliminarily providing a standard such as the setting of an allowable range to 1.5 times of an ideal angle. In other words, the arrangement regions 701 are determined in such a manner that an angle between adjacent arrangement regions 701 when viewed from an object does not exceed a predetermined value.

In step S405, based on the arrangement regions 701 of the camera groups 103, the lower limit resolution, and the imaging target region 503, the arrangement determination unit 306 determines the number of two or more cameras 102 belonging to a different one of the camera group 103 for each of the camera group 103 and an arrangement of the cameras 102. At this time, the number of two or more cameras 102 belonging to a different one of the camera groups 103 and an arrangement of the cameras 102 are determined in such a manner as to satisfy the following conditions. More specifically, for each of the camera groups 103, the number of two or more cameras 102 and an arrangement of the cameras 102 are determined in such a manner that images of the entire region of the imaging target region 503 are captured. Furthermore, the number of cameras 102 and an arrangement of the cameras 102 are determined in such a manner that resolutions exceed the lower limit resolution over the entire region of the imaging target region 503. In addition, an arrangement of the cameras 102 is determined in such a manner that the number of cameras 102 becomes as small as possible. An arrangement of the cameras 102 includes positions and orientations of the cameras 102.

Figure 8:
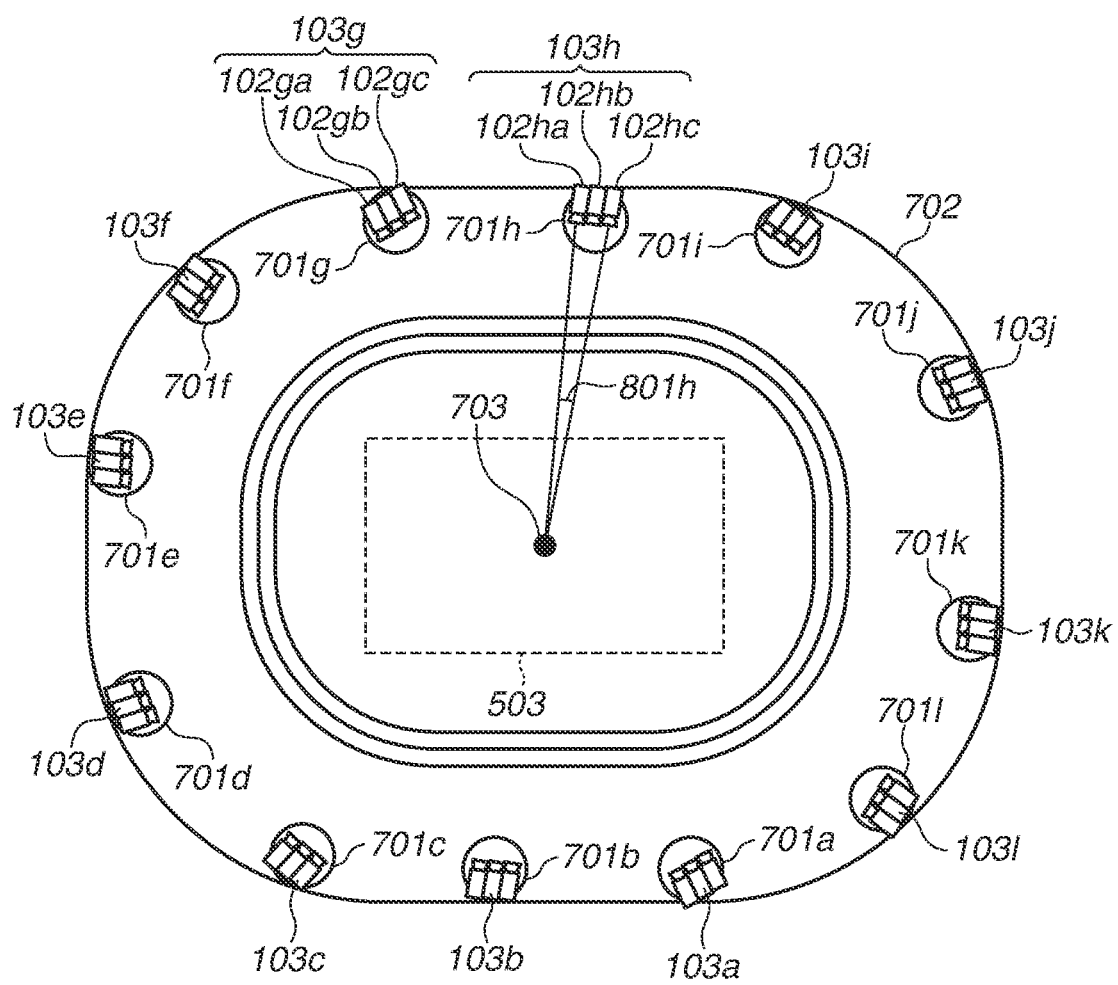
FIG. 8 is a diagram illustrating an arrangement example of a plurality of cameras in an arrangement region.

First of all, positions in the arrangement regions 701 at which a plurality of cameras 102 are arranged will be described with reference to FIG. 8. A plurality of cameras 102 belonging to a different one of the camera groups 103 is arranged in a corresponding one of the arrangement regions 701. For example, a plurality of cameras 102 belonging to the camera groups 103a is arranged in an arrangement region 701a corresponding the camera group 103a. In each of the arrangement regions 701, a plurality of cameras 102 belonging to a corresponding one of the camera group 103 is arranged at positions as close as possible.

Figure 9:
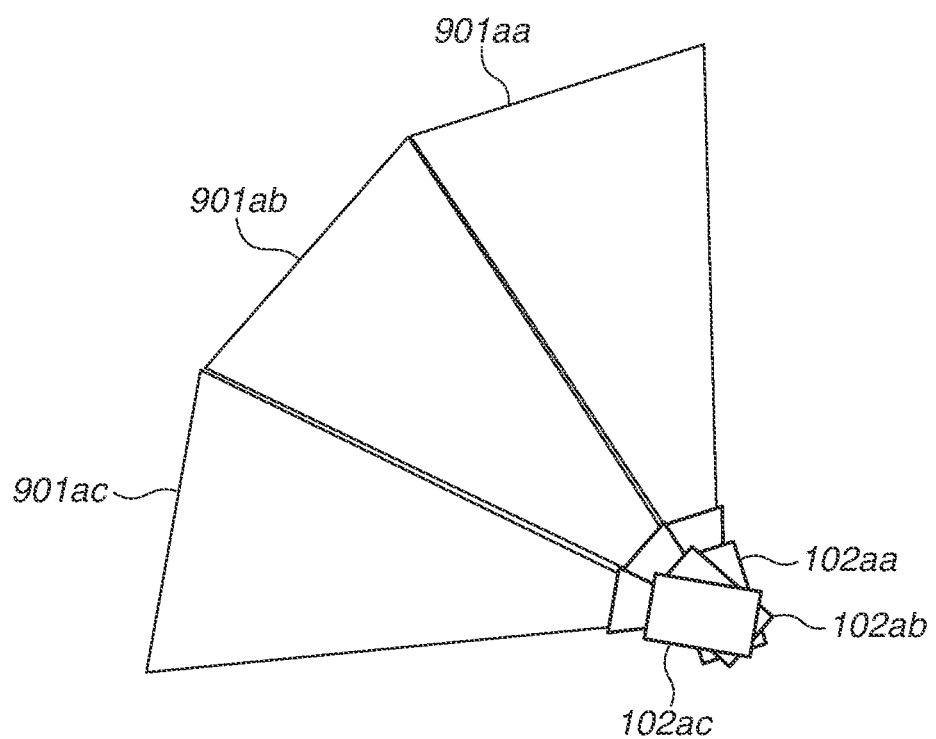
FIG. 9 is a diagram illustrating an ideal arrangement of a plurality of cameras.

FIG. 9 illustrates an example in which three cameras 102aa, 102ab, and 102ac in the same camera group 103a are arranged in such a manner that their optical centers overlap with each other, as an ideal state. The camera 102aa has an imaging range 901aa. The camera 102ab has an imaging range 901ab. The camera 102ac has an imaging range 901ac. The imaging ranges 901 of the cameras 102 spread radially. Thus, in a case where the optical centers overlap, the cameras 102aa, 102ab, and 102ac can be arranged in such a manner that the imaging ranges 901aa, 901ab, and 901ac are in contact with each other. By bringing the imaging ranges 901 into contact with each other without an overlap, the three cameras 102aa to 102ac can efficiently cover a wide region. In a real-world setting, the cameras 102 cannot be arranged in such a manner that optical centers overlap with each other, due to a physical constraint of the cameras 102. Thus, by arranging the cameras 102 at positions as close as possible, an overlap between the imaging ranges 901 is reduced.

Referring back to FIG. 8, for example, a plurality of cameras 102ha, 102hb, and 102hc belonging to a camera group 103h are arranged within a range of a predetermined angle 801h when viewed from the center 703 of the imaging target region 503. For example, a plurality of cameras 102 belonging to a camera group 103 is arranged within a predetermined distance.

The description will be given from another aspect. Each camera 102 is arranged closer to cameras 102 of a camera group 103 to which the camera 102 belongs, than to cameras 102 of other camera groups 103. For example, adjacent camera groups 103g and 103h will be described. Cameras 102ga, 102gb, and 102gc belong to a camera group 103g. The cameras 102ha, 102hb, and 102hc belong to the camera group 103h. In this case, the camera 102gc is arranged closer to the cameras 102ga and 102gb than to the cameras 102ha, 102hb, and 102hc. The reason is as follows. If the camera 102gc is arranged closer to the camera 102ha, an interval between the camera 102gc and a camera 102 of a camera group 103f arranged on the opposite side of the camera group 103h becomes larger, and image quality of a virtual viewpoint image declines in a certain direction.

Next, an example in which a plurality of cameras 102 belonging to a camera group 103 captures images of the entire region of the imaging target region 503 will be described with reference to FIGS. 10 to 12.

Figure 10:
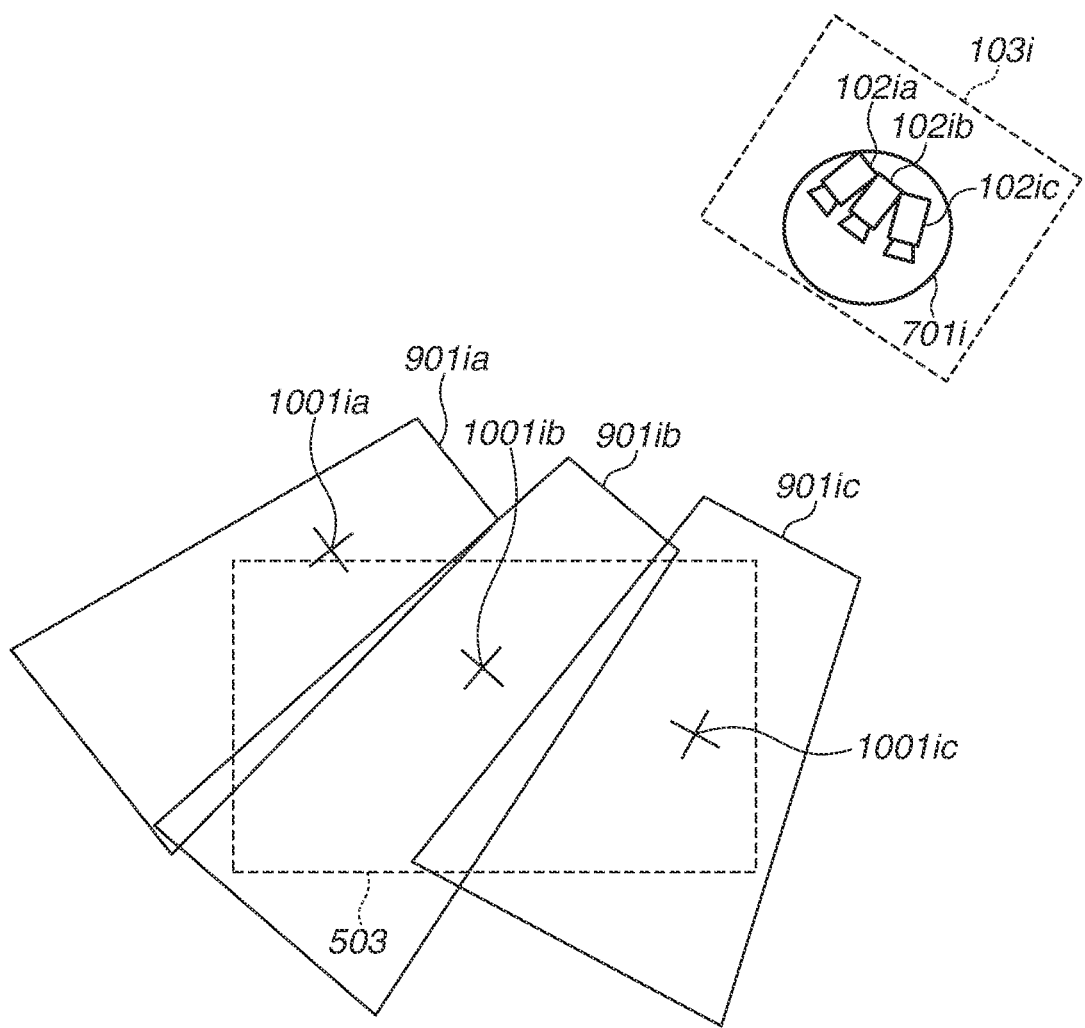
FIG. 10 is a diagram illustrating an arrangement example of a plurality of cameras.

FIG. 10 illustrates an example in which images of the entire region of the imaging target region 503 are captured by three cameras 102ia, 102ib, and 102ic of a camera group 103i. The camera 102ia has an imaging range 901ia. The camera 102ib has an imaging range 901ib. The camera 102ic has an imaging range 901ic. An imaging target range corresponds to a region in a captured image in which the resolution of a reference object exceeds the lower limit resolution. As illustrated in FIG. 10, if these imaging ranges 901ia, 901ib, and 901ic are combined, an image of the entire region of the imaging target region 503 is captured. For example, the three cameras 102 are arranged in a fan-like shape by arranging the camera 102ib at the center, arranging the camera 102ia on the right, and arranging the camera 102ic on the left. Consequently, the respective imaging ranges 901ia, 901ib, and 901ic also spread in a fan-like shape.

FIG. 10 is a diagram illustrating the imaging ranges 901ia to 901ic of the cameras 102ia to 102ic in an in-plane direction of the imaging target region 503. An imaging target region may be a three-dimensional space including a space up to a predetermined height of the field 501. In this case, the cameras 102 are to be arranged in such a manner as to capture images of imaging target regions including a predetermined height direction of the field 501. Because positions of optical centers of the three cameras 102 are not identical, for example, the imaging ranges 901ic and 901ib partially overlap with each other. By arranging the three cameras 102 as close as possible, an overlap between the imaging ranges 901 can be reduced, and the arrangement can be performed more efficiently. In other words, the number of cameras 102 necessary for the camera group 103 can be reduced.

In this example, an intersection point between an optical axis of a camera 102 and the field 501 of the stadium 702 is defined as an observation point (gaze point) 1001 of the camera 102. In FIG. 10, the camera 102ia has an observation point 1001ia. The camera 102ib has an observation point 1001ib. The camera 102ic has an observation point 1001ic. As illustrated in FIG. 10, the positions of all the observation points 1001 are different from each other. In other words, all the observation points of a plurality of cameras 102 belonging to the camera group 103 are different. Alternatively, one camera group 103 may include cameras 102 having the same observation point.

In an arrangement example of the cameras 102 in FIG. 10, optical axes of the cameras 102ia to 102ic are oriented in directions different from each other. In addition, line segments obtained by projecting line segments connecting the cameras 102ia to 102ic and their respective observation points onto the field 501 do not intersect with each other.

Figure 11A:
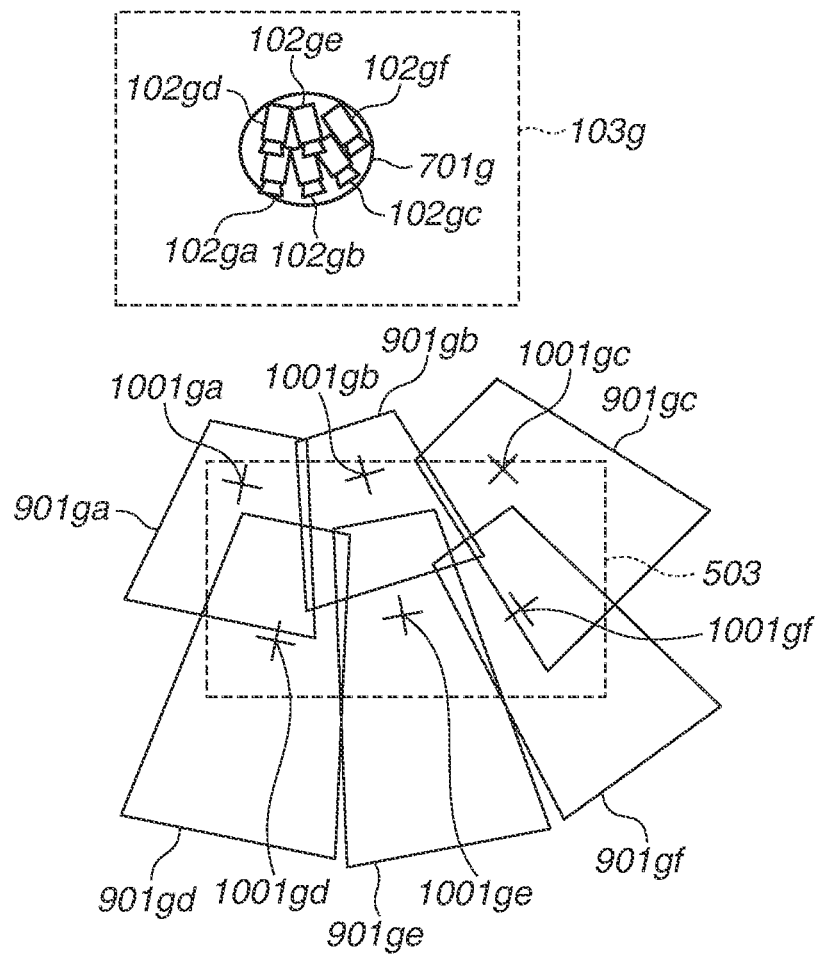
FIG. 11A is a diagram illustrating another arrangement example of a plurality of cameras.
Figure 11B:
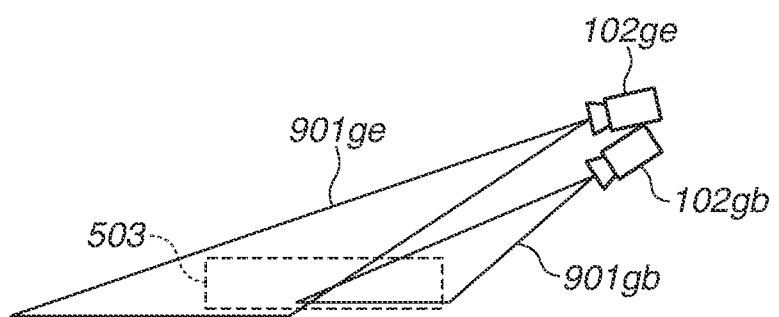
FIG. 11B is a diagram illustrating another arrangement example of a plurality of cameras.

FIGS. 11A and 11B are diagrams illustrating an arrangement example of cameras 102 belonging to a camera group 103. Six cameras 102ga, 102gb, 102gc, 102gd, 102ge, and 102gf are included in the camera group 103g. By the cameras 102ga, 102gb, 102gc, 102gd, 102ge, and 102gf, images of the entire region of the imaging target region 503 are captured.

FIG. 11A is a diagram illustrating the imaging target region 503 viewed from above, and is a diagram illustrating arrangement of the cameras 102ga, 102gb, 102gc, 102gd, 102ge, and 102gf in the in-plane direction of the imaging target region 503. The camera 102ga has an imaging range 901ga and an observation point 1101ga. The same applies to the cameras 102gb to 102gf. The six cameras 102 are further divided into two sub groups. The cameras 102ga, 102gb, and 102gc belong to the first sub group and are arranged to capture images of a front side of the imaging target region 503 (side closer to an arrangement region 701g of the camera group 103g) when viewed from the arrangement region 701. The cameras 102gd, 102ge, and 102gf belong to the second sub group and are arranged to capture images of a rear side of the imaging target region 503 (side distant from the arrangement region 701g of the camera group 103g) when viewed from the arrangement region 701. As illustrated in FIG. 11A, the cameras 102 in each sub group are arranged in such a manner that imaging ranges 901 spread in a fan-like shape.

FIG. 11B is a diagram illustrating the imaging target region 503 viewed from the side and is a diagram illustrating the arrangement of the cameras 102 in a height direction of the imaging target region 503. As illustrated in FIG. 11B, the cameras 102ga, 102gb, and 102gc that capture images of the front side of the imaging target region 503, and the cameras 102gd, 102ge, and 102gf that capture images of the rear side of the imaging target region 503 are arranged at different heights. For example, the camera 102gb that captures an image of the front side of the imaging target region 503 has a larger depression angle than the camera 102ge that captures an image of the rear side. Thus, by arranging the camera 102gb that captures an image of the front side of the imaging target region 503, on the lower side, it is possible to arrange cameras 102 much closer without causing physical interference. In other words, a plurality of cameras 102 belonging to a camera group 103 may be divided into sub groups, and cameras 102 of each sub group may be arranged at different heights.

Figure 12:
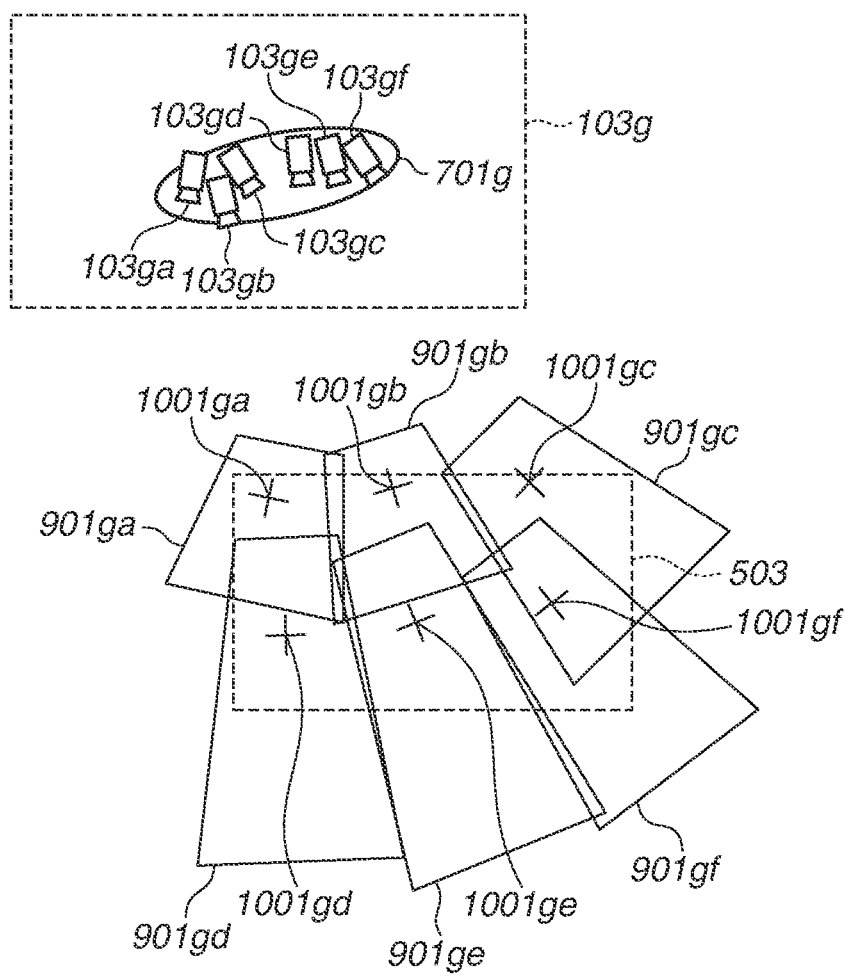
FIG. 12 is a diagram illustrating another arrangement example of a plurality of cameras.

FIG. 12 is a diagram illustrating another example arrangement of the cameras 102 belonging to the camera group 103g. Six cameras 102ga, 102gb, 102gc, 102gd, 102ge, and 102gf are included in the camera group 103g. By the cameras 102ga, 102gb, 102gc, 102gd, 102ge, and 102gf, images of the entire region of the imaging target region 503 are captured. In this example, cameras 102 of each sub group are arranged at positions different from each other. For example, the arrangement region 701g is set to include two pillars. Then, sub groups are respectively allocated to the two pillars. For example, the cameras 102ga, 102gb, and 102gc belonging to the first sub group are arranged on the left pillar viewed from the imaging target region 503. The cameras 102gd, 102ge, and 102gf belonging to the second sub group are arranged on the right pillar viewed from the imaging target region 503. In other words, a plurality of cameras 102 belonging to a camera group 103 may be divided into sub groups, and cameras 102 of each of the sub groups may be arranged at positions different from each other.

Based on differences in the lower limit resolution, the number of cameras 102 of each camera group 103 is varied. If the lower limit resolution is increased, a focal length of the camera 102 is to be made longer. Then, if the focal length is made longer, the imaging range 901 of the camera 102 becomes smaller. Thus, the number of cameras 102 necessary for capturing an image of the entire region of the imaging target region 503 increases. In contrast, if the lower limit resolution is decreased, a focal length of the camera 102 can be made shorter. If the focal length is made shorter, the imaging range 901 of the camera 102 becomes larger. Thus, the number of cameras 102 necessary for capturing an image of the entire region of the imaging target region 503 decreases.

In step S406, the arrangement determination unit 306 calculates the total number of cameras 102 determined for each of the camera groups 103 in step S405 and determines the number of cameras 102 necessary for the multicamera system 101.

In step S407, the arrangement determination unit 306 determines whether the number of cameras calculated in step S406 has no problem. Specifically, in a case where the number of cameras is larger or smaller than a predetermined number, the arrangement determination unit 306 determines that the calculated number of cameras has a problem. In a case where it is determined that the calculated number of cameras has no problem (YES in step S407), the processing ends. In a case where it is determined that the calculated number of cameras has a problem (NO in step S407), the processing proceeds to step S408. The predetermined number may be set based on budget or may be set based on processing capability of the virtual viewpoint image generation apparatus 106 and transmission band capacity in transmitting a captured image.

In step S408, the arrangement determination unit 306 determines an arrangement condition to be changed. A changeable arrangement condition is any of the imaging target region 503, the lower limit resolution, and the number of camera groups 103. An arrangement condition to be changed may be automatically determined by the arrangement determination unit 306, or may be directly input by the operator via the operation unit 206. Even in a case where an arrangement condition to be changed is automatically determined by the arrangement determination unit 306, the operator may preset a priority to an arrangement condition to be changed or preliminarily designate an arrangement condition to be changed.

In step S409, the arrangement determination unit 306 determines whether an arrangement condition to be changed is the imaging target region 503. In a case where an arrangement condition to be changed is the imaging target region 503 (YES in step S409), the processing proceeds to step S410. In a case where an arrangement condition to be changed is not the imaging target region 503 (NO in step S409), the processing proceeds to step S411.

In step S410, the imaging target region acquisition unit 304 changes the imaging target region 503. In a case where it is determined in step S407 that the calculated number of cameras has a problem because "the number of cameras is larger", the imaging target region acquisition unit 304 changes the imaging target region 503 to be smaller. In contrast, in a case where it is determined in step S407 that the calculated number of cameras has a problem because "the number of cameras is smaller", the imaging target region acquisition unit 304 changes the imaging target region 503 to be larger. In a case where the imaging target region 503 is changed by the imaging target region acquisition unit 304, the processing proceeds to step S405, and the arrangement determination unit 306 determines the number of cameras 102 and an arrangement again based on the changed imaging target region 503. The imaging target region acquisition unit 304 may acquire an imaging target region from the operator via the operation unit 206.

In step S411, the arrangement determination unit 306 determines whether an arrangement condition to be changed is a lower limit resolution. In a case where an arrangement condition to be changed is a lower limit resolution (YES in step S411), the processing proceeds to step S412. In a case where an arrangement condition to be changed is not a lower limit resolution (NO in step S411), the processing proceeds to step S413.

In step S412, the allowable value acquisition unit 303 changes the lower limit resolution. In a case where it is determined in step S407 that the calculated number of cameras has a problem because "the number of cameras is larger", the allowable value acquisition unit 303 changes the lower limit resolution to be smaller. In contrast, in a case where it is determined in step S407 that the calculated number of cameras has a problem because "the number of cameras is smaller", the allowable value acquisition unit 303 changes the lower limit resolution to be larger. After the lower limit resolution is changed by the allowable value acquisition unit 303, the processing proceeds to step S405, and the arrangement determination unit 306 determines the number of cameras 102 and an arrangement again based on the changed lower limit resolution. The allowable value acquisition unit 303 may acquire a lower limit resolution from the operator via the operation unit 206.

In step S413, the camera group number acquisition unit 305 changes the number of camera groups 103. In a case where it is determined in step S407 that the calculated number of cameras has a problem because "the number of cameras is larger", the camera group number acquisition unit 305 changes the number of camera groups 103 to be smaller. In contrast, in a case where it is determined in step S407 that the calculated number of cameras has a problem because "the number of cameras is smaller", the camera group number acquisition unit 305 changes the number of camera groups 103 to be larger. After the number of camera groups 103 is changed by the camera group number acquisition unit 305, the processing proceeds to step S404, and the arrangement determination unit 306 determines the arrangement regions 701 of the camera groups 103 again. Then, the processing proceeds to step S405, and the arrangement determination unit 306 determines the number of cameras 102 and an arrangement again. The camera group number acquisition unit 305 may acquire the number of camera groups from the operator via the operation unit 206.

Figure 13:
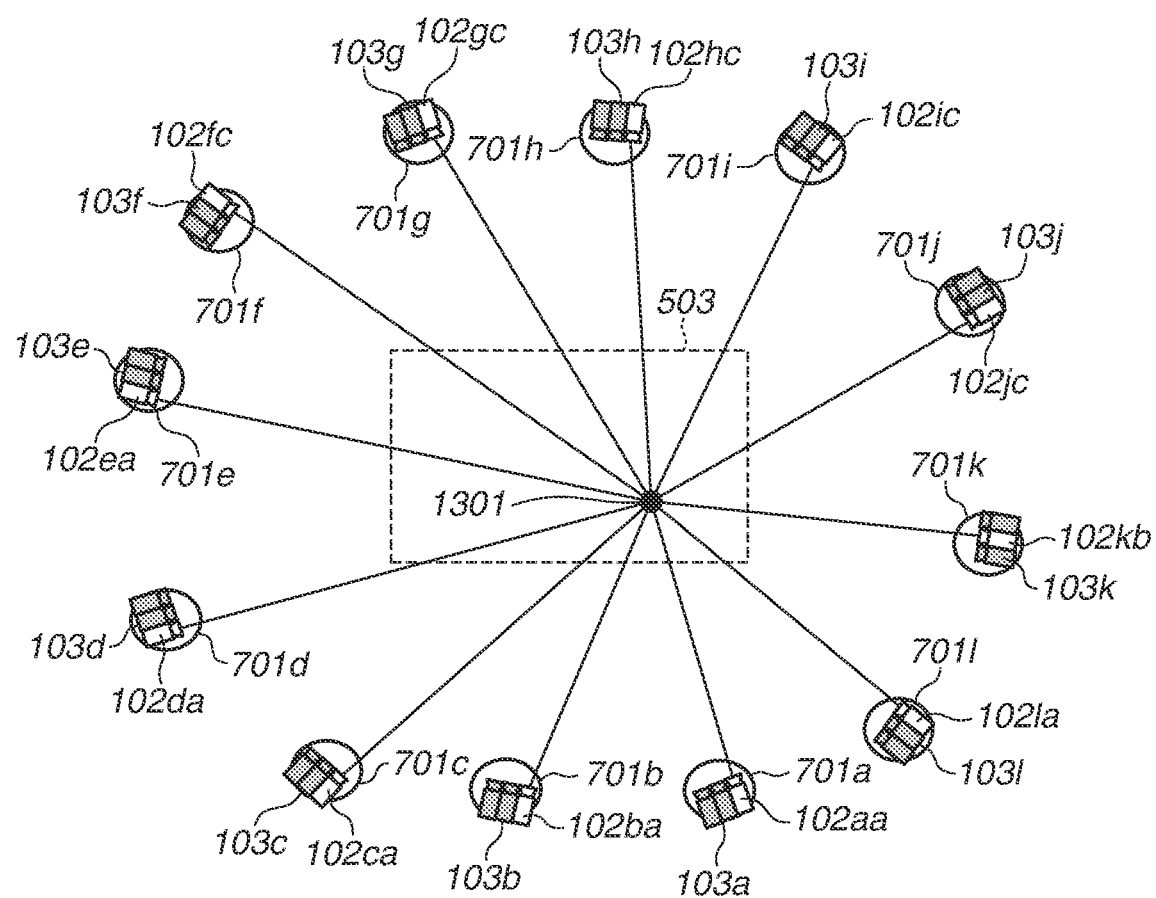
FIG. 13 is a diagram illustrating a determined arrangement example.

An effect of the arrangement determined by the arrangement determination apparatus 108 will be described with reference to FIG. 13. In each of the camera groups 103, a plurality of cameras 102 belonging a corresponding one of the camera groups 103 is arranged in such a manner that images of the entire region of the imaging target region 503 are captured. In other words, an image of an object at an arbitrary position in the imaging target region 503 is captured by at least one camera 102 in each of the camera groups 103. An object at a position 1301 will be considered. In the camera group 103a, the camera 102aa captures an image of the object at the position 1301. In a camera group 103b, a camera 102ba captures an image of the object at the position 1301. The same applies to the remaining camera groups. In other words, images of an object at an arbitrary position in the imaging target region 503 are captured by the same number of cameras 102 as the number of camera groups 103. The arrangement regions 701 each corresponding to a different one of the camera groups 103 are determined at intervals as equal as possible. In other words, it is possible to generate a high-quality virtual viewpoint image of an object at an arbitrary position in the imaging target region 503.

Second Exemplary Embodiment

Figure 16:
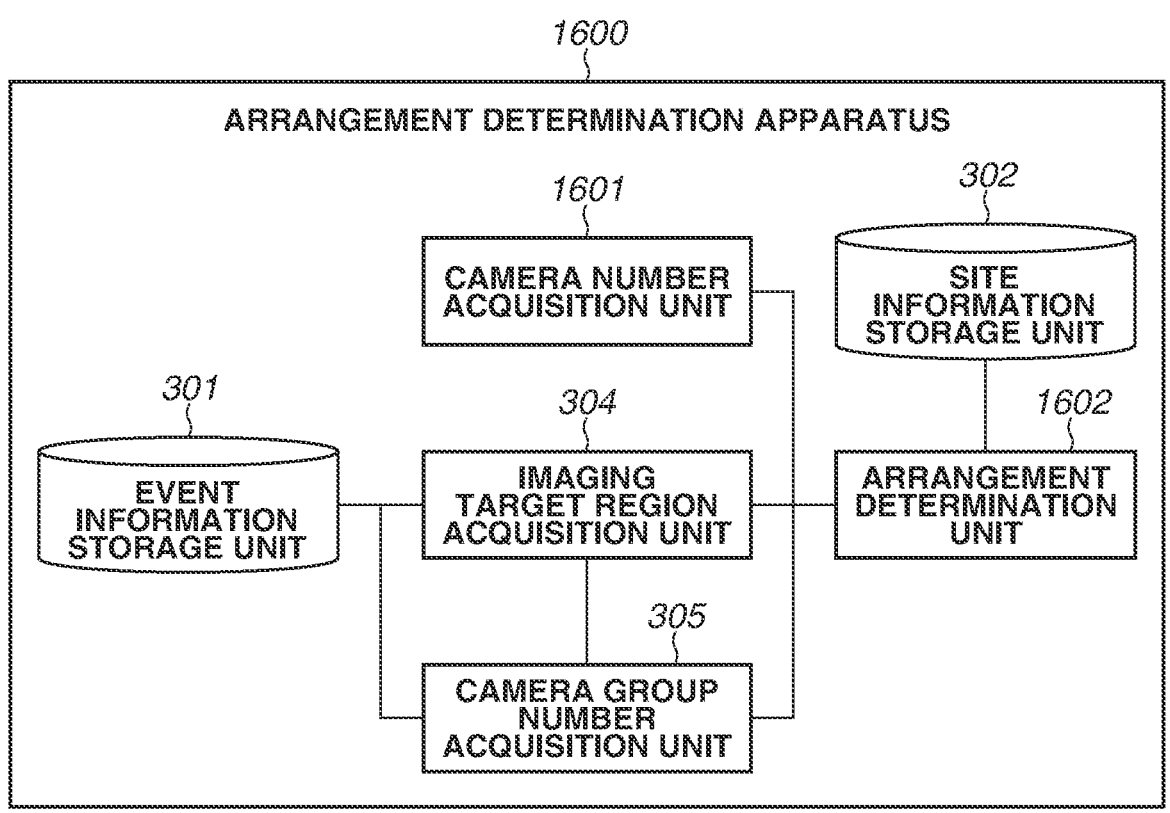
FIG. 16 is a diagram illustrating a configuration example of the arrangement determination apparatus according to the second exemplary embodiment.

In the present exemplary embodiment, an example of an arrangement determination apparatus 1600 different from that in the first exemplary embodiment will be described. FIG. 16 illustrates a functional configuration example of the arrangement determination apparatus 1600 in the present exemplary embodiment. As illustrated in FIG. 16, the arrangement determination apparatus 1600 includes a camera number acquisition unit 1601 in place of the allowable value acquisition unit 303 illustrated in FIG. 3. The arrangement determination apparatus 1600 includes an arrangement determination unit 1602 in place of the arrangement determination unit 306 illustrated in FIG. 3. Because a hardware configuration of the arrangement determination apparatus 1600 is the same as that illustrated in FIG. 2, the description will be omitted.

The camera number acquisition unit 1601 acquires the number of cameras 102 included in the multicamera system 101, directly from the operator via the operation unit 206. For example, the number of cameras 102 may be set based on processing performance of the virtual viewpoint image generation apparatus 106. As the processing performance of the virtual viewpoint image generation apparatus 106 becomes higher, a larger number of images can be processed. In other words, as the processing performance of the virtual viewpoint image generation apparatus 106 becomes higher, a larger value can be set as the number of cameras 102. The number of cameras 102 may be set based on budget. If the number of cameras 102 is increased, cost required for the arrangement increases. In other words, as the budget becomes larger, a larger value can be set as the number of cameras 102.

The camera number acquisition unit 1601 may have the following configuration. The camera number acquisition unit 1601 associates a scale of an event, which is one type of event information, and a density of objects with the number of cameras 102, and stores a table indicating the correspondence. Then, in a case where the camera number acquisition unit 1601 receives an input of information for identifying an event from an operator via the operation unit 206, the camera number acquisition unit 1601 may acquire the number of cameras 102 by referring to event information stored in the event information storage unit 301 and a table thereof. For example, in a case where a scale of an event is large, the number of cameras 102 is determined to be larger as compared with a case where a scale of an event is small. In a case where density of objects is large, the number of cameras 102 is determined to be larger as compared with a case where a density of objects is small.

The arrangement determination unit 1602 determines an arrangement of the cameras 102 based on the number of cameras 102, the imaging target region 503, the number of camera groups, and site information. The number of cameras 102 is acquired by the camera number acquisition unit 1601, the imaging target region 503 is acquired by the imaging target region acquisition unit 304, and the number of camera groups is acquired by the camera group number acquisition unit 305.

Figure 14:
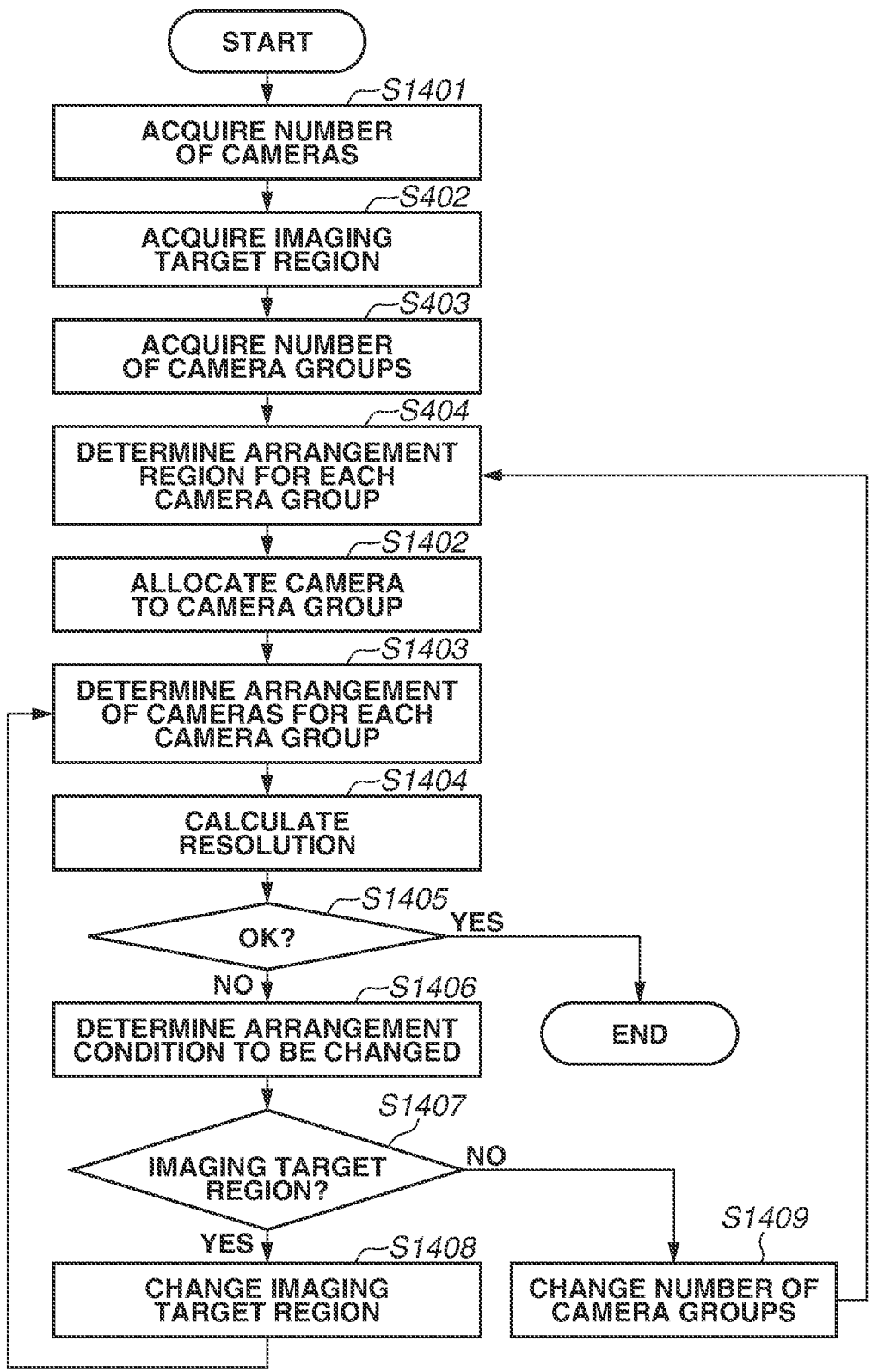
FIG. 14 is a flowchart illustrating a processing procedure example of an arrangement determination apparatus according to a second exemplary embodiment.

FIG. 14 is a flowchart illustrating an example of a processing procedure of the arrangement determination apparatus 1600. Because processing in steps S402 to S404 is the same as the processing in FIG. 4, the description will be omitted.

In step S1401, the camera number acquisition unit 1601 acquires the number of cameras 102. For example, the number of cameras 102 may be set based on processing performance of the virtual viewpoint image generation apparatus 106. As the processing performance of the virtual viewpoint image generation apparatus 106 becomes higher, a larger number of images can be processed. In other words, as the processing performance of the virtual viewpoint image generation apparatus 106 becomes higher, a larger value can be set as the number of cameras 102. For example, the number of cameras 102 may be set based on budget. If the number of cameras 102 is increased, cost required for the arrangement increases. In other words, as the budget becomes larger, a larger value can be set as the number of cameras 102.

Figure 15:
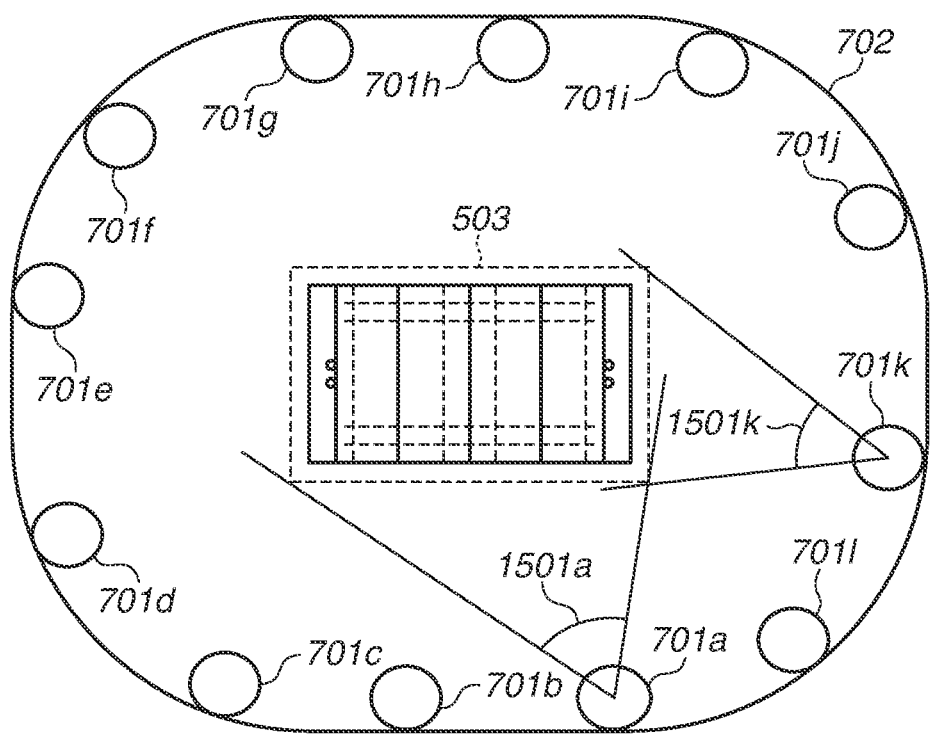
FIG. 15 is a diagram illustrating an angle of an imaging target region viewed from an arrangement region.

In step S1402, the arrangement determination unit 1602 allocates the cameras 102 by the number acquired in step S1401 to the camera groups 103 by the number acquired in step S403. The number of cameras 102 necessary for the camera groups 103 varies in accordance with a relationship between the imaging target region 503 acquired in step S402 and the arrangement regions 701. For example, as illustrated in FIG. 15, the imaging target region 503 viewed from the arrangement region 701 is indicated by an angle 1501. The angle 1501 of the imaging target region 503 viewed from the arrangement region 701a is an angle 1501a. Then, the cameras 102 are allocated to the camera group 103 in accordance with the angle 1501. In other words, a large number of cameras 102 are allocated to a camera group 103 with a large angle 1501 of the imaging target region 503 viewed from the arrangement region 701.

In step S1403, the arrangement determination unit 1602 determines an arrangement of the cameras 102 for each of the camera groups 103 based on the number of cameras 102 allocated to each of the camera groups 103 in step S1402 and site information. Specific arrangement of the cameras 102 is determined in such a manner that images of the entire region of the imaging target region 503 are captured. The cameras 102 are arranged in such a manner that resolutions become as high as possible over the entire region of the imaging target region 503.

In step S1404, the arrangement determination unit 1602 calculates a resolution in the entire region of the imaging target region 503 for each of the camera groups 103. In a region in which imaging ranges of the cameras 102 overlap with each other, images of an object are captured by a plurality of cameras 102. In this case, a value of a camera 102 having a larger resolution is used as a resolution.

In step S1405, the arrangement determination unit 1602 determines whether the resolution calculated in step S1404 has no problem. For example, in a case where a region in which a resolution is smaller than a predetermined value exists within the imaging target region 503, it is determined that the calculated resolution has a problem. In a case where it is determined that the calculated resolution has no problem (YES in step S1405), the processing ends. In a case where it is determined that the calculated resolution has a problem (NO in step S1405), the processing proceeds to step S1406.

In step S1406, the arrangement determination unit 1602 determines an arrangement condition to be changed. A changeable arrangement condition is any of the imaging target region 503 and the number of camera groups 103.

In step S1407, the arrangement determination unit 1602 determines whether an arrangement condition to be changed is the imaging target region 503. In a case where an arrangement condition to be changed is the imaging target region 503 (YES in step S1407), the processing proceeds to step S1408. In a case where an arrangement condition to be changed is not the imaging target region 503 (NO in step S1407), the processing proceeds to step S1409.

In step S1408, the imaging target region acquisition unit 304 changes the imaging target region 503. Specifically, the imaging target region acquisition unit 304 changes the imaging target region 503 to be smaller, to obtain a higher calculated resolution. After the imaging target region 503 is changed by the imaging target region acquisition unit 304, the processing proceeds to step S1403, and the arrangement determination unit 1602 determines an arrangement of the cameras 102 for each of the camera groups 103. Then, the processing proceeds to step S1404. The imaging target region acquisition unit 304 may acquire an imaging target region from the operator via the operation unit 206.

In step S1409, the camera group number acquisition unit 305 changes the number of camera groups 103. Specifically, the camera group number acquisition unit 305 changes the number of camera groups 103 to be smaller, to obtain a higher calculated resolution. This is because, if the number of camera groups 103 is decreased, the number of cameras 102 allocated to the camera group 103 increases, and a resolution becomes higher. After the number of camera groups 103 is changed by the camera group number acquisition unit 305, the processing proceeds to step S404, and the arrangement determination unit 1602 determines the arrangement regions 701 of the camera groups 103 again. Then, the processing proceeds to steps S1402 and S1403, and the arrangement determination unit 1602 determines the number of cameras 102 and arrangement again. The camera group number acquisition unit 305 may acquire the number of camera groups from the operator via the operation unit 206.

Also in the present exemplary embodiment, an effect similar to the first exemplary embodiment can be obtained. In other words, images of an object at an arbitrary position in the imaging target region 503 are captured by the same number of cameras 102 as the number of camera groups 103. In addition, the arrangement regions 701 each corresponding to a different one of the camera groups 103 are determined at intervals as equal as possible. In other words, it is possible to generate a high-quality virtual viewpoint image of an object at an arbitrary position in the imaging target region 503.

Third Exemplary Embodiment

Figure 18:
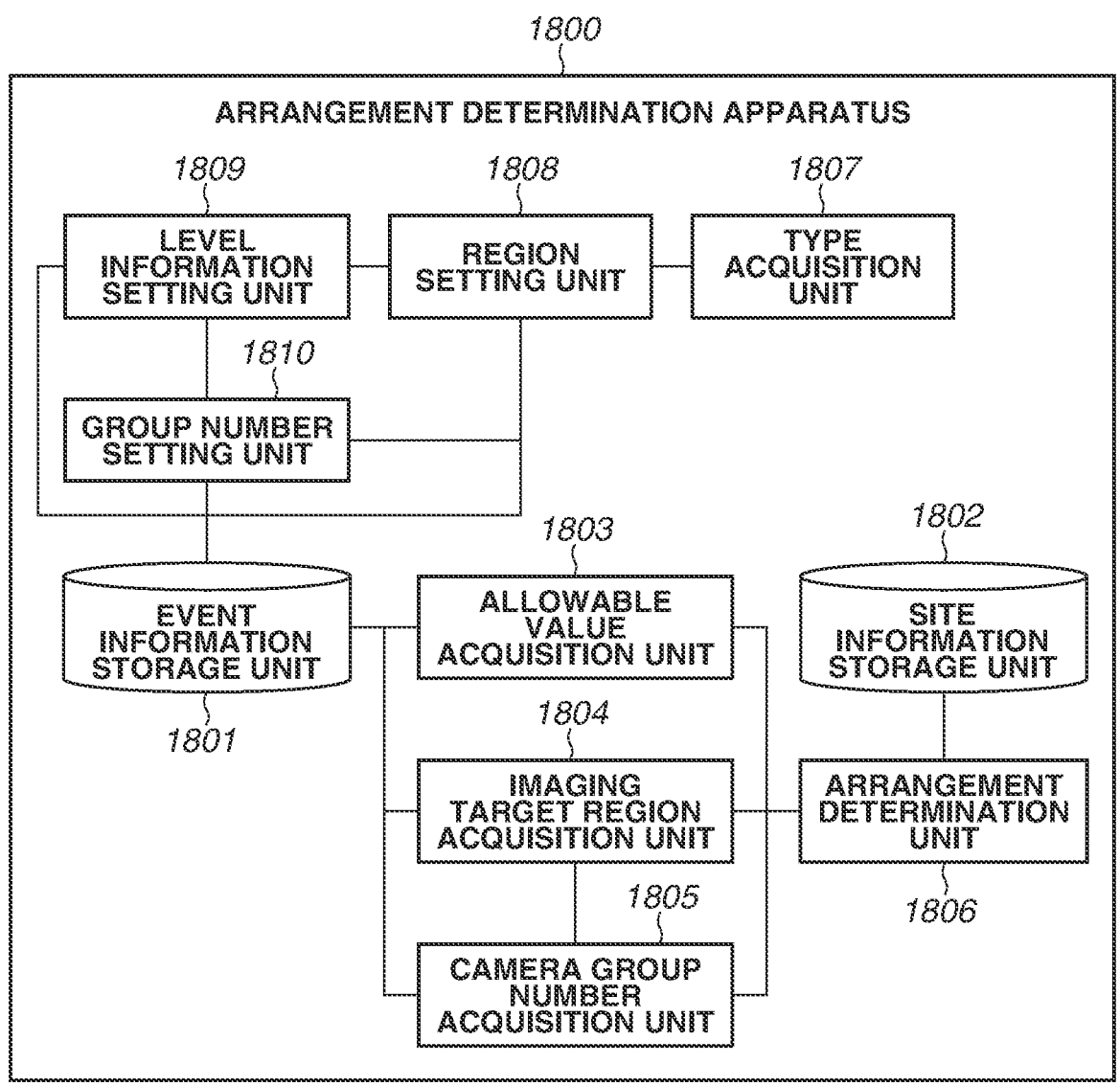
FIG. 18 is a diagram illustrating a configuration example of an arrangement determination apparatus according to a third exemplary embodiment.

In the present exemplary embodiment, an example of an arrangement determination apparatus 1800 different from that in the first exemplary embodiment will be described. FIG. 18 illustrates a functional configuration example of the arrangement determination apparatus 1800 in the present exemplary embodiment. As illustrated in FIG. 18, the arrangement determination apparatus 1800 includes an event information storage unit 1801, a site information storage unit 1802, an allowable value acquisition unit 1803, an imaging target region acquisition unit 1804, a camera group number acquisition unit 1805, and an arrangement determination unit 1806. The arrangement determination apparatus 1800 further includes a type acquisition unit 1807, a region setting unit 1808, a level information setting unit 1809, and a group number setting unit 1810. The type acquisition unit 1807, the region setting unit 1808, the level information setting unit 1809, and the group number setting unit 1810 are functional units for generating event information, and the arrangement determination apparatus may not include these functional units. In other words, as long as event information generated by the type acquisition unit 1807, the region setting unit 1808, the level information setting unit 1809, and the group number setting unit 1810 is stored in the event information storage unit 1801, the arrangement of cameras can be determined based on the event information. Because a hardware configuration of the arrangement determination apparatus 1800 is the same as that illustrated in FIG. 2, the description will be omitted. The following description will be mainly given of a difference from the first exemplary embodiment.

In the present exemplary embodiment, a plurality of spaces is defined in a space (e.g., the space 504 in FIG. 5B) serving as an imaging target of a plurality of cameras, and each of the plurality of defined spaces is regarded as an imaging target region. Then, for a plurality of imaging target regions, the arrangement determination apparatus 1800 in the present exemplary embodiment determines the number of camera groups and the arrangement and the number of cameras of each camera group and the arrangement. The present exemplary embodiment needs not be applied to all imaging target regions of a plurality of imaging target regions, and the present exemplary embodiment may be applied to one of a plurality of imaging target regions.

All of a plurality of defined spaces are included in a space (e.g., the space 504 in FIG. 5B) serving as an imaging target of a plurality of cameras. A plurality of defined spaces may be defined exclusively. In other words, a plurality of spaces may be defined as a plurality of spaces dividing the space 504 in FIG. 5B. Among a plurality of defined spaces, arbitrary two spaces may partially overlap with each other, and one space may be encompassed by the other space.

The type acquisition unit 1807 acquires a type of a foreground (object) mainly appearing in an event, and a moving range thereof. By an operator inputting via the operation unit 206, information regarding a type of an object and a moving range thereof is input, and the type acquisition unit 1807 acquires the information. FIG. 19A illustrates an example of the information. FIG. 19A illustrates an example in which an event is rugby, a person (player) and a ball are input as types of a main object, and a person is input with being classified into a motionless person and a moving person. Furthermore, a moving range of each object is input in association with the type of the object. The moving range indicates a range in which a person or a ball might exist during a match of rugby. For example, a moving range of a motionless person indicates a range in which a motionless person might exist. Thus, a moving range of a motionless person has lengths substantially equal to vertical and horizontal lengths of a field. A length in a height direction becomes equal to a body height (e.g., two meters) of a player, for example. On the other hand, a moving range of a moving person is larger than a moving range of a motionless person. For example, because a player sometimes lifts another player for taking the throw in due to line-out in rugby, a moving range of a moving person is larger in a height direction than a moving range of a motionless person. Specifically, the height is set to about five meters. A moving range of a ball is further larger. For example, because a kicked ball rises high in rugby, the height of a moving range of a ball is set to 20 m. In addition, moving ranges of a moving person and a ball are larger than that of a motionless person also in vertical and horizontal directions (i.e., an in-plane direction of a field).

Information acquired by the type acquisition unit 1807 is output to the region setting unit 1808, also output to the event information storage unit 1801, and is stored by the event information storage unit 1801. Specifically, the event information storage unit 1801 stores a table illustrated in FIG. 19A. The event information storage unit 1801 may store information output by the type acquisition unit 1807, in a format other than the table illustrated in FIG. 19A.

For inputting information illustrated in FIG. 19A, the operator inputs information for identifying a type of an event and another event, information regarding a size of a field, information regarding a density of objects, and information regarding an intended purpose of a virtual viewpoint image similarly to the first exemplary embodiment. In a case where the arrangement determination apparatus 1800 is used only for a specific event, the input of information for identifying a type of an event and another event can be omitted.

Figure 20A:
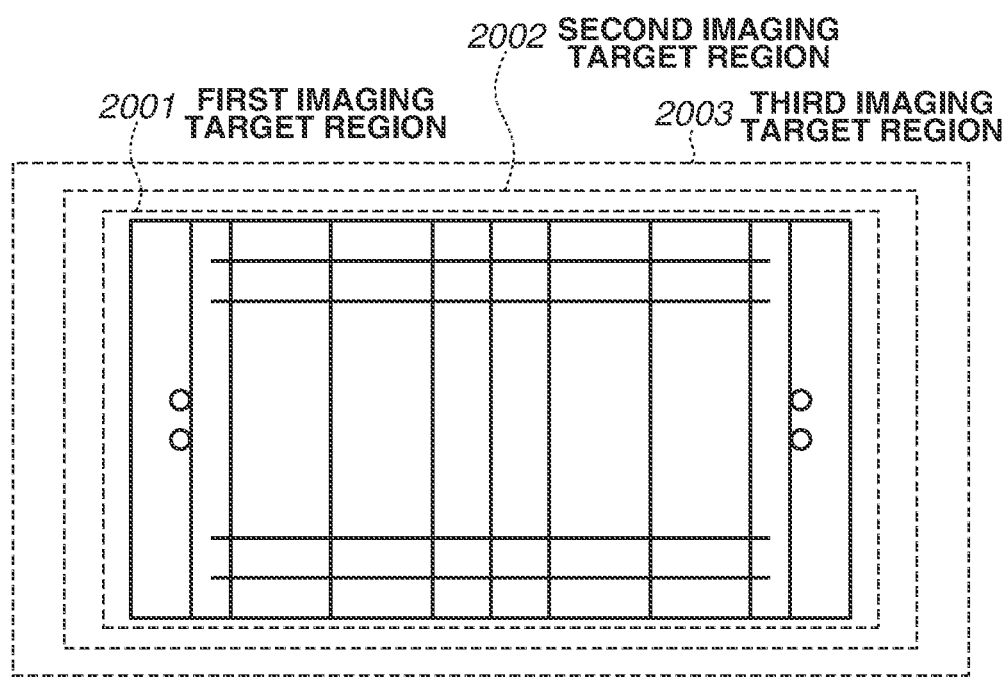
FIG. 20A is a diagram illustrating an example of an imaging target region according to the third exemplary embodiment.
Figure 20B:
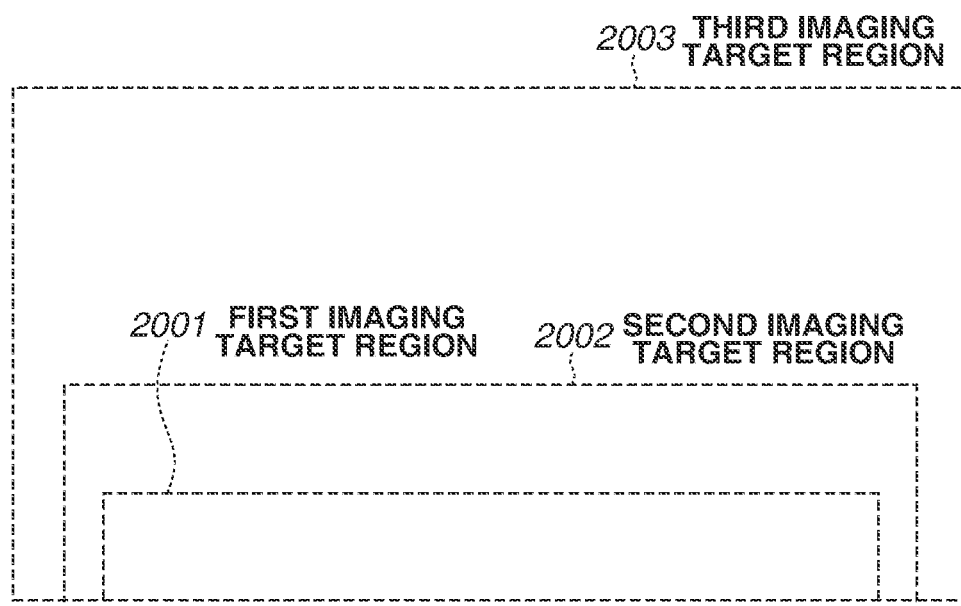
FIG. 20B is a diagram illustrating an example of an imaging target region according to the third exemplary embodiment.

The region setting unit 1808 sets a plurality of imaging target regions based on information indicating a type of an object and a moving range thereof that has been acquired by the type acquisition unit 1807. Among a plurality of imaging target regions, arbitrary two or more imaging target regions may partially overlap with each other. FIGS. 20A and 20B illustrate a relationship between imaging target regions in an example in which three imaging target regions are set. FIG. 20A is a schematic diagram illustrating a field viewed from above, and illustrates a relationship of vertical and horizontal sizes between the three imaging target regions. FIG. 20B is a diagram illustrating a field viewed from the side, and illustrates a relationship of heights between the three imaging target regions. In this example, a first imaging target region 2001 corresponds to a moving range of a motionless person, a second imaging target region 2002 corresponds to a moving range of a moving person, and a third imaging target region 2003 corresponds to a moving range of a ball. The first imaging target region 2001, the second imaging target region 2002, and the third imaging target region 2003 become larger in range in this order. The first imaging target region 2001 is included in the second imaging target region 2002, and the second imaging target region 2002 is included in the third imaging target region 2003. Not all but a part of the first imaging target region 2001 may be included in the second imaging target region 2002. Not all but a part of the second imaging target region 2002 may be included in the third imaging target region 2003.

Information indicating a plurality of imaging target regions set by the region setting unit 1808 is output to the level information setting unit 1809, output also to the event information storage unit 1801, and stored by the event information storage unit 1801.

The region setting unit 1808 may set imaging target regions in such a manner that the same imaging target region corresponds to moving ranges of a motionless person and a moving person. Specifically, without setting the first imaging target region 2001 in FIGS. 20A and 20B, the region setting unit 1808 may set the remaining regions, the second imaging target region 2002 and the third imaging target region 2003.

For each of a plurality of imaging target regions set by the region setting unit 1808, the level information setting unit 1809 sets a quality demand level of three-dimensional shape data and a demand level of a lower limit resolution. The level information setting unit 1809 receives an input performed by the operator via the operation unit 206 and sets the demand levels. FIG. 19B illustrates an example of a quality demand level of three-dimensional shape data and a demand level of a lower limit resolution that correspond to each imaging target region. In this example, a quality demand level of three-dimensional shape data and a demand level of a lower limit resolution are defined in three levels of "high", "medium", and "low". The demand level of the lower limit resolution may be defined by the number of pixels indicating a lower limit resolution as described in the first exemplary embodiment.

A main object of the first imaging target region 2001 is a motionless person. By displaying a motionless person with high image quality in a virtual viewpoint image, it is possible to enhance the quality of the virtual viewpoint image. Thus, the level information setting unit 1809 sets "high" as a quality demand level of three-dimensional shape data and a demand level of a lower limit resolution for the first imaging target region 2001 corresponding to a moving range of a motionless person. The "high" demand level of a lower limit resolution means a level at which at least a visage and a contour of a face become clear. As a specific numerical value example, 400 pixels are set as the number of pixels corresponding to the height of two meters in a captured image. This corresponds to demanding a resolution of at least 0.5 cm/pixel.

A main object of the second imaging target region 2002 is a moving person. Because a moving person is moving unlike a motionless person, the image quality of a moving person that is lower than the image quality of a motionless person is allowable. Thus, "medium" is set as a quality demand level of three-dimensional shape data and a demand level of a lower limit resolution for the second imaging target region 2002. As a specific numerical value example of a lower limit resolution level, 200 pixels are set as the number of pixels corresponding to the height of two meters in a captured image.

A main object of the third imaging target region 2003 is a ball. In rugby, a ball can move more quickly than a person, and is smaller than a person. Thus, the image quality of a ball that is lower than the image quality of a moving person is allowable.

In FIG. 19B, a quality demand level of three-dimensional shape data and a demand level of a lower limit resolution for one imaging target region are at the same level, but a quality demand level of three-dimensional shape data and a demand level of a lower limit resolution may not be at the same level depending on the event. For example, a quality demand level of three-dimensional shape data for one imaging target region may be "high", and a demand level of a lower limit resolution for the imaging target region may be "low".

Information set by the level information setting unit 1809 is output to the group number setting unit 1810 and the event information storage unit 1801, and is stored by the event information storage unit 1801. Specifically, the event information storage unit 1801 stores the table illustrated in FIG. 19B. The event information storage unit 1801 may store information output by the type acquisition unit 1807, in a format other than the table illustrated in FIG. 19B.

The group number setting unit 1810 sets the number of camera groups 103 based on a quality demand level of three-dimensional shape data that has been set by the level information setting unit 1809. The accuracy of three-dimensional shape data becomes higher as the number of camera groups becomes larger. Thus, as a demand level becomes higher, a larger number of camera groups is set. FIG. 19C illustrates each imaging target region and the number of camera groups. FIG. 19C illustrates an example in which, in a case where a quality demand level of three-dimensional shape data is "high", the number of camera groups is set to "30", in a case where a quality demand level of three-dimensional shape data is "medium", the number of camera groups is set to "24", and in a case where a quality demand level of three-dimensional shape data is "low", the number of camera groups is set to "10". Information set by the group number setting unit 1810 is output also to the event information storage unit 1801 and is stored by the event information storage unit 1801. Specifically, the event information storage unit 1801 stores a table illustrated in FIG. 19C. The event information storage unit 1801 may store information output by the type acquisition unit 1807, in a format other than the table illustrated in FIG. 19C.

The group number setting unit 1810 may uniquely set the number of camera groups based on a quality demand level of three-dimensional shape data, but may set the number of camera groups also based on a density of objects. In the example of rugby, while density in the first imaging target region 2001 is high because play, such as scrum and maul, occurs, densities are low in the second imaging target region 2002 and the third imaging target region 2003. The group number setting unit 1810 sets the number of camera groups also in consideration of this point. More specifically, the group number setting unit 1810 sets a larger number of camera groups as density becomes higher.

The event information storage unit 1801 stores information regarding an imaging target event. Aside from information described in the first exemplary embodiment, event information may include information indicating a type of an object, information indicating an image capturing region, and information regarding density of objects of each image capturing region, which have been set for each event.

The site information storage unit 1802 stores information regarding a site in which a plurality of cameras 102 is arranged. The site information is information similar to the information described in the first exemplary embodiment.

When the camera 102 captures an image of a predetermined reference object, the allowable value acquisition unit 1803 sets a lower limit value of a resolution being a size of the object in the image. Specifically, based on information indicating a correspondence relationship between a plurality of imaging target regions set for each event, which is one type of event information, and a demand level of a lower limit resolution, the allowable value acquisition unit 1803 sets a lower limit value for each imaging target region. Information indicating a correspondence relationship between a plurality of imaging target regions set for each event, and a demand level of a lower limit resolution may be stored in the event information storage unit 1801 as a correspondence table illustrated in FIG. 19B, or may be stored in an external storage device. With this configuration, in a case where the allowable value acquisition unit 1803 receives an input of information for identifying an event from the operator via the operation unit 206, the allowable value acquisition unit 1803 sets a lower limit resolution for a plurality of imaging target regions set for the event.

The allowable value acquisition unit 1803 may acquire information, such as a numerical value of a lower limit resolution, directly from the operator via the operation unit 206.

Based on event information, the imaging target region acquisition unit 1804 determines a plurality of imaging target regions corresponding to the event. Specifically, the imaging target region acquisition unit 1804 is required to have the following configuration. The imaging target region acquisition unit 1804 initially stores a table associating at least partial information of event information and information indicating a plurality of imaging target regions. At least partial information of event information includes information indicating a type of an object, information regarding a moving range of an object, and information regarding a size of a field. Then, in a case where the imaging target region acquisition unit 1804 receives an input of information for identifying an event from the operator via the operation unit 206, the imaging target region acquisition unit 1804 determines a plurality of imaging target regions by referring to event information stored in the event information storage unit 1801 and a table thereof. The table to be referred to is not limited to this as long as information regarding a type of an object, information regarding a moving range of an object, and information regarding a plurality of imaging target regions are associated. Information other than the above-described event information and information regarding an imaging target region may also be associated. In the table to be referred to, information for identifying an event, such as a name of an event, and a plurality of imaging target regions may be associated. The table to be referred to may be stored in the event information storage unit 1801, or may be stored in an external apparatus.

The imaging target region acquisition unit 1804 may acquire information regarding an imaging target region directly from the operator via the operation unit 206.

The camera group number acquisition unit 1805 may set a camera group by referring to a table associating event information and the number of camera groups 103. In other words, in a case where the camera group number acquisition unit 305 receives an input of information for identifying an event via the operation unit 206, the camera group number acquisition unit 1805 acquires the number of camera groups 103 for each imaging target region by referring to event information stored in the event information storage unit 1801 and a table thereof. FIG. 19C illustrates an example of a table to be referred to. The table to be referred to is not limited to this as long as information regarding an imaging target region and information regarding the number of camera groups 103 are associated. The table to be referred to may be stored in the event information storage unit 1801 or may be stored in an external apparatus.

The camera group number acquisition unit 1805 may acquire information regarding the number of camera groups 103 directly from the operator via the operation unit 206.

The arrangement determination unit 1806 determines the arrangement of the cameras 102 based on a lower limit resolution, a plurality of imaging target regions, the number of camera groups of each of the plurality of imaging target region, and site information. The lower limit resolution is acquired by the allowable value acquisition unit 1803, the plurality of imaging target regions is acquired by the imaging target region acquisition unit 1804, and the number of camera groups is acquired by the camera group number acquisition unit 1805. The site information is stored in the site information storage unit 1802. The arrangement determination unit 1806 acquires necessary site information from the site information storage unit 1802 based on information for identifying a site that has been input via the operation unit 206. For example, site information to be acquired includes information regarding a structure in a site on which the cameras 102 can be arranged, and a position of the structure, and information regarding the number of cameras 102 that can be arranged.

Similarly to the first exemplary embodiment, the arrangement determination unit 1806 initially determines, for each of a plurality of imaging target regions, arrangement positions of the camera groups 103 based on the number of camera groups and site information. Next, the arrangement determination unit 1806 determines the arrangement of a plurality of cameras 102 belonging a different one of the camera groups 103, for each of the camera groups 103. At this time, the arrangement determination unit 1806 determines the arrangement of a plurality of cameras 102 belonging to each of the camera groups 103 in such a manner that images of the entire region of each of the imaging target regions are captured by the plurality of cameras 102 belonging to the camera group 103. In other words, the arrangement of a plurality of cameras 102 belonging to a camera group 103 for the first imaging target region 2001 is determined in such a manner that images of the entire region of the first imaging target region 2001 are captured by the plurality of cameras 102 belonging to the camera group 103. The arrangement of a plurality of cameras 102 belonging to a camera group 103 for the second imaging target region 2002 and a plurality of cameras 102 belonging to a camera group 103 for the third imaging target region 2003 is similarly determined.

Furthermore, the arrangement determination unit 1806 determines the arrangement of the plurality of cameras 102 in such a manner that resolutions of the plurality of cameras 102 belonging to the camera group 103 exceed a lower limit resolution over the entire region of each of the imaging target regions. The arrangement determination unit 1806 determines the arrangement of a plurality of cameras 102 in such a manner that a condition regarding the above-described imaging target region and a condition regarding a resolution are satisfied in all the camera groups 103 each corresponding to a different one of the imaging target regions, but the determination is not limited to this. For example, the arrangement determination unit 1806 may determine the arrangement of a plurality of cameras 102 in such a manner that only a plurality of cameras 102 belonging to a predetermined number of camera groups 103 satisfy the above-described conditions. The arrangement determination unit 1806 may determine the arrangement of a plurality of cameras 102 belonging to a camera group 103 at a predetermined position or camera groups 103 in a predetermined relationship in such a manner that the camera groups 103 satisfy the above-described conditions. In other words, a plurality of cameras 102 belonging to a part of the camera groups 103 may be arranged in such a manner that images of not the entire region of each imaging target region but a partial region of each imaging target region are captured by the plurality of cameras 102. Resolutions of a plurality of cameras 102 belonging to a part of the camera groups 103 need not exceed a lower limit resolution in a partial region of each imaging target region.

Figure 21:
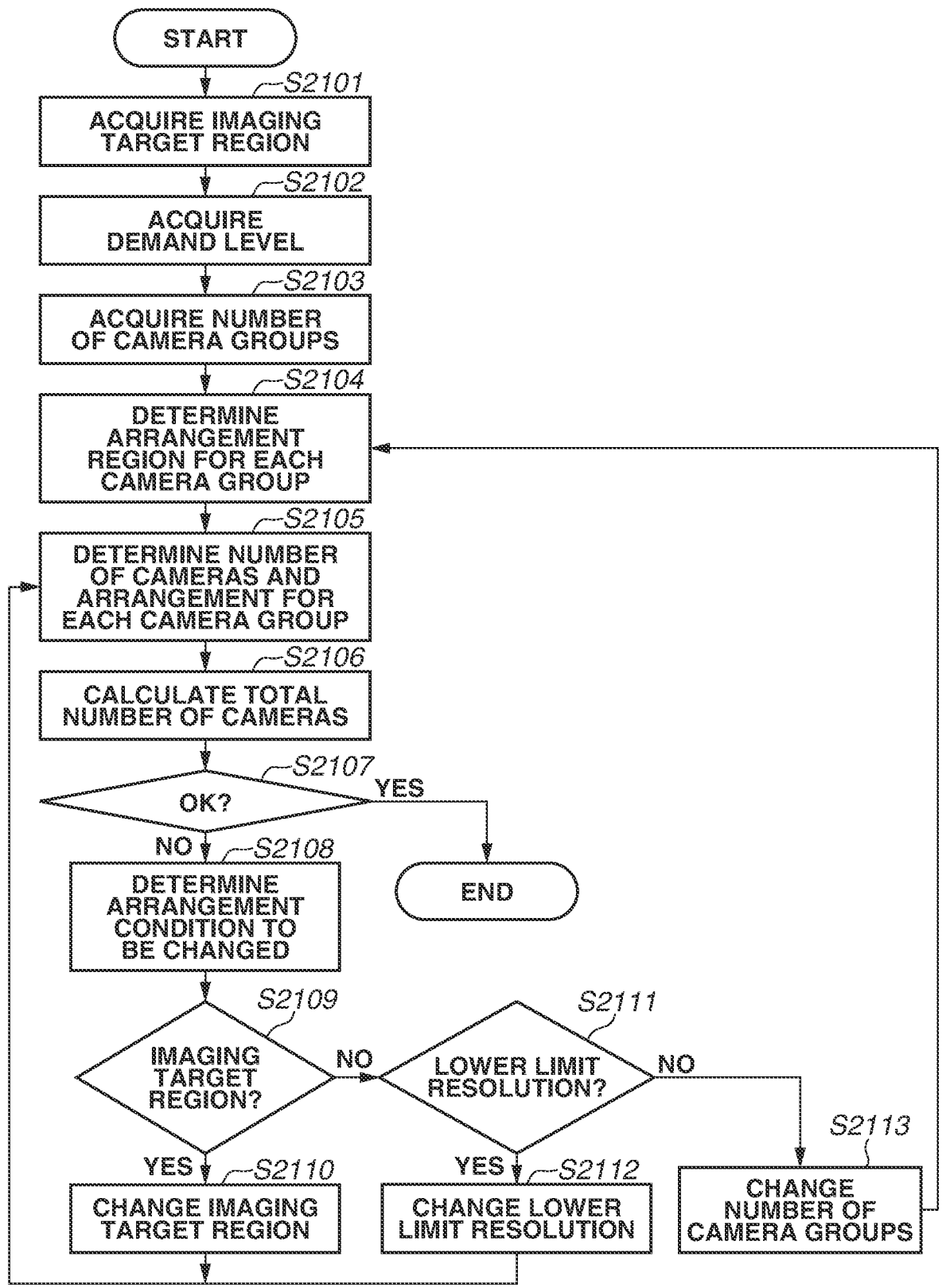
FIG. 21 is a flowchart illustrating a processing procedure example of the arrangement determination apparatus according to the third exemplary embodiment.

FIG. 21 is a flowchart illustrating an example of a processing procedure of the arrangement determination apparatus 1800. Processing to be performed by the arrangement determination apparatus 1800 will be described with reference to FIG. 21.

First of all, the arrangement determination apparatus 1800 receives an instruction of arrangement determination from the operator via the operation unit 206. Then, in step S2101, the imaging target region acquisition unit 1804 determines and acquires a plurality of imaging target regions. Specifically, a plurality of imaging target regions is determined based on information for identifying an event input from the operator via the operation unit 206 and a prestored table. As the plurality of imaging target regions, the first imaging target region 2001, the second imaging target region 2002, and the third imaging target region 2003 are set as illustrated in FIGS. 20A and 20B.

Next, in step S2102, the allowable value acquisition unit 1803 acquires a quality demand level of three-dimensional shape data and a level of a lower limit resolution. The allowable value acquisition unit 1803 determines and acquires a quality demand level of three-dimensional shape data and a level of a lower limit resolution for each of the imaging target regions based on information for identifying an event input from the operator via the operation unit 206 and a prestored table.

Next, in step S2103, the camera group number acquisition unit 1805 determines and acquires the number of camera groups 103 for each of the imaging target regions. The number of camera groups 103 is determined in accordance with a quality demand level of three-dimensional shape data generated by the virtual viewpoint image generation apparatus 106. The number of directions necessary for generating the three-dimensional shape data varies in accordance with a quality demand level of three-dimensional shape data. In other words, in a case where a quality demand level of three-dimensional shape data is high, that is to say, in a case where the accuracy of three-dimensional shape data is to be improved, because image capturing is to be performed from a larger number of directions, the number of camera groups 103 becomes larger. On the other hand, in a case where a quality demand level of three-dimensional shape data is low, because the accuracy of three-dimensional shape data may be low, the number of image capturing directions may be reduced, and the number of camera groups 103 can be consequently reduced.

The camera group number acquisition unit 1805 can determine the number of camera groups 103 by associating a quality demand level of three-dimensional shape data and the number of necessary directions (i.e., the number of camera groups) and referring to a table. Because a quality demand level of three-dimensional shape data and an imaging target region are associated, in this example, the number of camera groups 103 is determined by referring to a table (FIG. 19C) associating not a quality demand level of three-dimensional shape data but an imaging target region with the number of camera groups.

Hereinafter, as an example, the respective numbers of camera groups 103 for the first imaging target region 2001, the second imaging target region 2002, and the third imaging target region 2003 are determined to be 30, 24, and 10. Arrangement regions of the camera groups 103 may be determined in the processing. In the present exemplary embodiment, an example in which arrangement regions of the camera groups 103 are determined in the next step S2104 is illustrated.

In step S2104, the arrangement determination unit 1806 determines arrangement regions of the camera groups 103 for each of imaging target regions based on the number of camera groups and site information. Because the processing corresponds to performing processing similar to the processing in step S404 of FIG. 4 for each of a plurality of imaging target regions, the description will be omitted.

In step S2105, the arrangement determination unit 1806 determines the number of two or more cameras 102 belonging to the camera group 103 and an arrangement for each of the camera groups 103 of the respective imaging target regions based on arrangement regions of the camera groups 103 and a lower limit resolution demand level. Because the processing corresponds to performing processing similar to the processing in step S405 of FIG. 4 for each of a plurality of imaging target regions, the description will be omitted. The arrangement of the cameras 102 determined by the arrangement determination unit 1806 is also similar to the first exemplary embodiment.

In step S2106, the arrangement determination unit 1806 calculates the total number of cameras 102 determined for each of the camera groups 103 of the respective imaging target region in step S2105, and determines the number of cameras 102 necessary for the multicamera system 101.

In step S2107, the arrangement determination unit 1806 determines whether the number of cameras calculated in step S2106 has no problem. Because the processing in step S2107 is processing similar to the processing in step S407 of FIG. 4, the detailed description will be omitted. In a case where it is determined that the calculated number of cameras has no problem (YES in step S2107), the processing ends. In a case where it is determined that the calculated number of cameras has a problem (NO in step S2107), the processing proceeds to step S2108.

In step S2108, the arrangement determination unit 1806 determines an arrangement condition to be changed. A changeable arrangement condition is any of an imaging target region, the lower limit resolution, and the number of camera groups 103. Because the processing in step S2108 is processing similar to the processing in step S408 of FIG. 4, the detailed description will be omitted.

In step S2109, the arrangement determination unit 1806 determines whether an arrangement condition to be changed is an imaging target region. In a case where an arrangement condition to be changed is an imaging target region (YES in step S2109), the processing proceeds to step S2110. In a case where an arrangement condition to be changed is not an imaging target region (NO in step S2109), the processing proceeds to step S2111.

In step S2110, the imaging target region acquisition unit 1804 the imaging target region. The imaging target region acquisition unit 1804 changes one or more imaging target regions of the plurality of imaging target regions. In other words, the imaging target region acquisition unit 1804 needs not change all the imaging target regions. In a case where it is determined in step S2107 that the number of calculated cameras has a problem because "the number of cameras is larger", the imaging target region acquisition unit 1804 changes one or more imaging target regions of the plurality of imaging target regions to be smaller. In contrast, in a case where it is determined in step S2107 that the number of calculated cameras has a problem because "the number of cameras is smaller", the imaging target region acquisition unit 1804 changes one or more imaging target regions of the plurality of imaging target regions to be larger. After the imaging target region is changed by the imaging target region acquisition unit 1804, the processing proceeds to step S2105, and the arrangement determination unit 1806 determines the number of cameras 102 and an arrangement again based on the plurality of imaging target regions including the changed imaging target region. The imaging target region acquisition unit 1804 may acquire an imaging target region from the operator via the operation unit 206.

In step S2111, the arrangement determination unit 1806 determines whether an arrangement condition to be changed is a lower limit resolution. In a case where an arrangement condition to be changed is a lower limit resolution (YES in step S2111), the processing proceeds to step S2112. In a case where an arrangement condition to be changed is not a lower limit resolution (NO in step S2111), the processing proceeds to step S2113.

In step S2112, the allowable value acquisition unit 1803 changes a lower limit resolution demand level. In a case where it is determined that the number of calculated cameras has a problem because "the number of cameras is larger", the allowable value acquisition unit 1803 changes a lower limit resolution demand level of one or more imaging target regions to be smaller. In contrast, in a case where it is determined that the number of calculated cameras has a problem because "the number of cameras is smaller", the allowable value acquisition unit 1803 changes a lower limit resolution demand level of one or more imaging target regions to be larger. After the lower limit resolution is changed by the allowable value acquisition unit 1803, the processing proceeds to step S2105, and the arrangement determination unit 1806 determines the number of cameras 102 and an arrangement again. The allowable value acquisition unit 1803 may acquire a lower limit resolution demand level from the operator via the operation unit 206.

In step S2113, the camera group number acquisition unit 1805 changes the number of camera groups 103. In a case where it is determined in step S2107 that the number of calculated cameras has a problem because "the number of cameras is larger", the camera group number acquisition unit 1805 changes the number of camera groups 103 of one or more imaging target regions to be smaller. In contrast, in a case where it is determined in step S2107 that the number of calculated cameras has a problem because "the number of cameras is smaller", the camera group number acquisition unit 1805 changes the number of camera groups 103 of one or more imaging target regions to be larger. After the number of camera groups 103 is changed by the camera group number acquisition unit 1805, the processing proceeds to step S2104, and the arrangement determination unit 1806 determines arrangement regions of the camera groups 103 again. Then, the processing proceeds to step S2105, and the arrangement determination unit 1806 determines the number of cameras 102 and an arrangement again. The camera group number acquisition unit 1805 may acquire the number of camera groups from the operator via the operation unit 206.

According to the present exemplary embodiment, an effect similar to the first exemplary embodiment is caused. More specifically, a plurality of cameras 102 belonging to each of the camera groups 103 of the respective imaging target regions is arranged in such a manner that images of the entire region of the imaging target region corresponding to the camera group 103 are captured. For this reason, an image of an object at an arbitrary position in an imaging target region is captured by at least one camera 102 in each of the camera groups 103. Then, images of an object at an arbitrary position in an imaging target region are captured by the same number of cameras 102 as the number of camera groups 103. In addition, the arrangement regions of the respective camera groups 103 are determined at intervals as equal as possible. In other words, it is possible to generate a high-quality virtual viewpoint image of an object at an arbitrary position in an imaging target region.

In the present exemplary embodiment, in a case where there are a plurality of demand levels of resolutions in images based on the type of an object and a moving range thereof, an imaging target region is set for each of the plurality of demand levels. Then, by determining, for each of the imaging target regions, the number of camera groups 103 and an arrangement, and the number of cameras 102 and an arrangement within the camera group, it is possible to arrange an appropriate number of cameras suitable for the type of the object at appropriate positions. For example, in a case where the space 504 in FIG. 5B of the first exemplary embodiment, and the third imaging target region 2003 in FIGS. 20A and 20B are the same, the number of cameras 102 can be reduced more than the first exemplary embodiment. This is because the number of camera groups 103 and the number of cameras 102 are uniformly determined in the first exemplary embodiment irrespective of the type of an object and a moving range. For example, in the first exemplary embodiment, because image capturing is performed by all cameras belonging to a camera group even in a region distant from the ground level, i.e., a region of the third imaging target region 2003 that is not included in the second imaging target region 2002, the number of cameras 102 becomes larger. Because only a ball serves as an object in the region, a quality demand level of three-dimensional shape data may be low, and there is no need to perform image capturing with high resolution. Thus, according to the present exemplary embodiment, the number of camera groups 103 for capturing images of the region is reduced in view of this point. Furthermore, the number of cameras 102 belonging to the camera groups 103 is also reduced.

In the third exemplary embodiment, for example, the first imaging target region 2001 and the second imaging target region 2002 may share one or more camera groups. In this case, the number of cameras 102 can be reduced more. In this case, the following processing is performed: The processing in step S404 is performed as follows. The arrangement determination unit 1806 determines an arrangement of the camera groups 103 for the first imaging target region 2001. In addition, the arrangement determination unit 1806 determines an arrangement of the camera groups 103 for the second imaging target region 2002. Then, the arrangement determination unit 1806 determines whether the camera groups 103 determined for the first imaging target region 2001 include camera groups 103 disposed at positions close to the camera groups 103 determined for the second imaging target region 2002. In a case where the camera groups 103 of the first imaging target region 2001 include camera groups 103 disposed at positions close to the camera groups 103 determined for the second imaging target region 2002, the camera groups 103 are excluded from the first imaging target region 2001. Similarly to the above description, the number of cameras 102 belonging to a camera group 103 and the arrangement are determined in accordance with a lower limit resolution demand level and a quality demand level of three-dimensional shape data based on an imaging target region corresponding to the camera group 103. For example, twelve arrangement regions 701a to 701l as illustrated in FIG. 7 are determined for the first imaging target region 2001. On the other hand, positions close to the arrangement regions 701b, 701d, 701f, 701h, 701j, and 701k as illustrated in FIG. 7 are determined for the second imaging target region 2002. In this case, the arrangement regions 701b, 701d, 701f, 701h, 701j, and 701k are excluded from the camera groups of the first imaging target region 2001. In other words, the arrangement regions 701a, 701c, 701e, 701g, 701i, and 701l remain as the camera groups of the first imaging target region 2001, and subsequent processing is performed.

In this manner, it is possible to appropriately generate three-dimensional shape data using a multicamera system in which one or more camera groups are shared by the first imaging target region 2001 and the second imaging target region 2002. In addition, by alternately arranging camera groups 103 of the first imaging target region 2001 and the camera groups 103 of the second imaging target region 2002, it is possible to reduce directional nonuniformity of a quality level in generating three-dimensional shape data. In the second imaging target region 2002, captured images of not only cameras of the camera groups 103 of the second imaging target region 2002 but also cameras of the camera groups 103 of the first imaging target region 2001 are used for the generation of three-dimensional shape data of an object. For improving the image quality in determining a pixel value of a virtual viewpoint image, captured images of cameras of the camera groups 103 of the first imaging target region 2001 with high demand level of lower limit resolution are used. In a case where captured images of cameras of the camera groups 103 of the first imaging target region 2001 are used preferentially, captured images of cameras of the camera groups 103 of the second imaging target region 2002 may also be used. For example, in a case where a pixel value of a targeted pixel in a virtual viewpoint image is determined by averaging processing of pixel values of positions in a plurality of captured images corresponding to a targeted pixel by using weight, the processing is performed as follows. A weight of a pixel value of a position corresponding to a targeted pixel in captured images of cameras of the camera groups 103 of the first imaging target region 2001 is made larger than a weight of a pixel value of a position corresponding to a targeted pixel in captured images of cameras of the camera groups 103 of the second imaging target region 2002.

The first imaging target region 2001 and the second imaging target region 2002 are used as examples, but the number of cameras 102 can also be reduced by sharing of a part of camera groups of arbitrary two or more imaging target regions of a plurality of imaging target regions.

In addition, the type acquisition unit 1807 may acquire information regarding a plurality of imaging target regions instead of the type of an object. In other words, for example, in FIG. 19A, the type of an imaging target region (the first imaging target region 2001, the second imaging target region 2002, the third imaging target region 2003), and information indicating lengths in vertical, horizontal, and height directions that define the imaging target region may be acquired. The description has been given of an example in which an event is rugby, but the present exemplary embodiment can also be applied to a ball sport, such as soccer, and athletic sports. For example, in 100-meter sprints as a field track event, it is considered that a high-quality virtual viewpoint image is demanded in the vicinity of a goal point more than other locations on a track on which a player runs. In this case, various demand levels may be increased for a region in the vicinity of a goal point, and various demand levels may be decreased in other regions.

Other Exemplary Embodiments

The object of the present invention can also be achieved by the following configuration. A storage medium recording a program code of software implementing a function of the above-described exemplary embodiment is supplied to a system or an apparatus. A computer (or a CPU or a micro processing unit (MPU)) of the system or the apparatus reads out and executes the program code stored in the storage medium.

In this case, the program code read out from the storage medium itself implements the function of the above-described exemplary embodiment, and the storage medium storing the program code is included in the present invention.

As a storage medium for supplying a program code, for example, a flexible disk, a hard disk, an optical disk, a magneto-optic disk, a compact disk read only memory (CD-ROM), a CD recordable (CD-R), a magnetic tape, a nonvolatile memory card, or a ROM can be used.

In addition, a case where the function of the above-described exemplary embodiment is implemented by the following processing is also included. Based on an instruction of a program code read out by a computer, an operating system (OS) operating on the computer performs a part or all of actual processing.

Furthermore, a case where the function of the above-described exemplary embodiment is implemented by the following processing is also included. First of all, a program code read out from a storage medium is written into a memory included in a functionality expansion board inserted into a computer, or a functionality expansion unit connected to the computer. Next, based on an instruction of the program code, a CPU included in the functionality expansion board or the functionality expansion unit performs a part or all of actual processing.

The present invention is not limited to the above-described exemplary embodiments, and various changes and modifications can be made without departing from the spirit and scope of the present invention. The following claims are therefore appended for setting forth the scope of the present invention.

According to an exemplary embodiment of the present invention, a difference in reproducibility of objects between virtual viewpoints can be reduced even in a wide-range imaging target region.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An arrangement determination apparatus comprising:
one or more memories storing instructions; and
one or more processors executing the instructions to:
obtain first information representing an imaging target region captured by a plurality of imaging apparatuses used to generate a virtual viewpoint image;
obtain second information regarding a plurality of groups corresponding to a plurality of directions in which the imaging target region is to be captured; and
determine an arrangement of the plurality of imaging apparatuses based on the obtained first information and the obtained second information, wherein the imaging target region is captured from a first direction by two or more imaging apparatuses of the plurality of imaging apparatuses that is arranged according to the determined arrangement, the two or more imaging apparatuses belonging to a first group corresponding to the first direction among the plurality of groups, and the imaging target region is captured from a second direction different from the first direction by other two or more imaging apparatuses of the plurality of imaging apparatuses that are different from the two or more imaging apparatuses, the other two or more imaging apparatuses belonging to a second group corresponding to the second direction among the plurality of groups.

2. The arrangement determination apparatus according to claim 1,
wherein the one or more processors further execute the instructions to obtain third information relating to resolution of an image captured by an imaging apparatus, and
wherein the third information represents, in a case where a reference object is in the imaging target region, an allowable value of the number of pixels representing a size of the reference object in an image acquired by the imaging apparatuses performing image capturing.

3. The arrangement determination apparatus according to claim 2, wherein the reference object is an object having a predetermined size with respect to the imaging target region.

4. The arrangement determination apparatus according to claim 2, wherein the reference object is an upstanding person having a predetermined body height.

5. The arrangement determination apparatus according to claim 2, wherein the allowable value is determined based on an intended purpose of the virtual viewpoint image.

6. The arrangement determination apparatus according to claim 5, wherein, in a case where the virtual viewpoint image is used in live broadcast, the allowable value is smaller than that in a case where the virtual viewpoint image is used in archive distribution.

7. The arrangement determination apparatus according to claim 1,
wherein the one or more processors further execute the instruction to obtain third information representing the number of the imaging apparatuses,
wherein an arrangement of the plurality of imaging apparatuses is determined further based on the third information.

8. The arrangement determination apparatus according to claim 7, wherein the number is determined based on processing performance of an apparatus to generate the virtual viewpoint image.

9. The arrangement determination apparatus according to claim 1, wherein an arrangement of the plurality of imaging apparatuses is determined further based on third information regarding a site in which the plurality of imaging apparatuses is arranged.

10. The arrangement determination apparatus according to claim 1,
wherein the second information is information representing the number of groups corresponding to the plurality of directions,
wherein arrangement regions of the groups are determined based on the obtained second information, and
wherein for each of the groups, an arrangement of imaging apparatuses belonging to the groups is determined.

11. The arrangement determination apparatus according to claim 10, wherein the number of groups is determined based on a type of an event.

12. The arrangement determination apparatus according to claim 1, wherein an angle formed by line segments connecting a predetermined position in the imaging target region and arrangement regions of respective adjacent two groups does not exceed a predetermined value.

13. The arrangement determination apparatus according to claim 1, wherein an interval between imaging apparatuses in a group does not exceed a predetermined distance.

14. The arrangement determination apparatus according to claim 1, wherein an imaging apparatus of the two or more imaging apparatuses that is arranged according to the determined arrangement and that is closer to the other two or more imaging apparatuses is closer to a different imaging apparatus of the two or more imaging apparatuses than all imaging apparatuses of the other two or more imaging apparatuses.

15. The arrangement determination apparatus according to claim 1, wherein the imaging target region is at least a part of a space serving as a target of image capturing to be performed by the plurality of imaging apparatuses.

16. The arrangement determination apparatus according to claim 15,
wherein the space includes a first imaging target region, and a second imaging target region different from the first imaging target region,
wherein the first imaging target region is captured by two or more first imaging apparatuses of the plurality of imaging apparatuses that is arranged according to the determined arrangement and the first imaging target region is captured by two or more second imaging apparatuses of the plurality of imaging apparatuses that are different from the first imaging apparatuses, and
wherein the second imaging target region is captured by two or more third imaging apparatuses of the plurality of imaging apparatuses that are different from the first and second imaging apparatuses, and the first imaging target region is captured by two or more fourth imaging apparatuses of the plurality of imaging apparatuses that are different from the first to third imaging apparatuses.

17. The arrangement determination apparatus according to claim 16, wherein the second imaging target region includes the first imaging target region.

18. A system comprising:
a plurality of imaging apparatuses configured to capture an imaging target region, and
a generation apparatus configured to generate a virtual viewpoint image based on a captured image acquired by the plurality of imaging apparatuses,
wherein the plurality of imaging apparatuses comprises two or more imaging apparatuses that capture the imaging target region from a first direction and that belong to a first group which is included in a plurality of groups corresponding to a plurality of directions and which corresponds to the first direction included in the plurality of directions, and different two or more imaging apparatuses of the plurality of imaging apparatuses that are different from the two or more imaging apparatuses, that capture the imaging target region from a second direction, and that belong to a second group which is included in the plurality of groups corresponding to the plurality of directions and which corresponds to the second direction of the plurality of directions.

19. The system according to claim 18, wherein an imaging apparatus of the two or more imaging apparatuses that is closer to the other two or more imaging apparatuses is closer to a different imaging apparatus of the two or more imaging apparatuses than all imaging apparatuses of the other two or more imaging apparatuses.

20. The system according to claim 18, wherein an angle formed by line segments connecting a predetermined position in the imaging target region and arrangement regions of respective adjacent two groups does not exceed a predetermined value.

21. The system according to claim 18, wherein an angle formed by the first direction and the second direction does not exceed a predetermined value.

22. An arrangement determination method comprising:
obtaining first information representing an imaging target region captured by a plurality of imaging apparatuses used to generate a virtual viewpoint image;
obtaining second information regarding a plurality of groups corresponding to a plurality of directions in which the imaging target region is to be captured; and
determining an arrangement of the plurality of imaging apparatuses based on the obtained first information and the obtained second information wherein the imaging target region is captured from a first direction by two or more imaging apparatuses of the plurality of imaging apparatuses that is arranged according to the determined arrangement, the two or more imaging apparatuses belonging to a first group corresponding to the first direction among the plurality of groups, the imaging target region is captured from a second direction different from the first direction by different two or more imaging apparatuses of the plurality of imaging apparatuses that are different from the two or more imaging apparatuses, the other two or more imaging apparatuses belonging to a second group corresponding to the second direction among the plurality of groups.

23. A non-transitory computer-readable recording medium storing a program that causes a computer to execute an arrangement determination method comprising:
obtaining first information representing an imaging target region captured by a plurality of imaging apparatuses used to generate a virtual viewpoint image;
obtaining second information regarding a plurality of groups corresponding to a plurality of directions in which the imaging target region is to be captured; and
determining an arrangement of the plurality of imaging apparatuses based on the obtained first information and the obtained second information wherein the imaging target region is captured from a first direction by two or more imaging apparatuses of the plurality of imaging apparatuses that is arranged according to the determined arrangement, the two or more imaging apparatuses belonging to a first group corresponding to the first direction among the plurality of groups, the imaging target region is captured from a second direction different from the first direction by different two or more imaging apparatuses of the plurality of imaging apparatuses that are different from the two or more imaging apparatuses, the other two or more imaging apparatuses belonging to a second group corresponding to the second direction among the plurality of groups.

* * * * *